(12) United States Patent
Zhang et al.

(10) Patent No.: US 11,350,109 B2
(45) Date of Patent: May 31, 2022

(54) COMBINATION OF INTER-PREDICTION AND INTRA-PREDICTION IN VIDEO CODING

(71) Applicant: QUALCOMM Incorporated, San Diego, CA (US)

(72) Inventors: Kai Zhang, San Diego, CA (US); Jianle Chen, San Diego, CA (US); Li Zhang, San Diego, CA (US); Xiang Li, Saratoga, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/999,741

(22) Filed: Aug. 21, 2020

(65) Prior Publication Data

US 2021/0105485 A1 Apr. 8, 2021

Related U.S. Application Data

(63) Continuation of application No. 16/015,027, filed on Jun. 21, 2018, now Pat. No. 10,757,420.

(Continued)

(51) Int. Cl.
*H04N 19/159* (2014.01)
*H04N 19/513* (2014.01)
(Continued)

(52) U.S. Cl.
CPC ......... *H04N 19/159* (2014.11); *H04N 19/107* (2014.11); *H04N 19/11* (2014.11);
(Continued)

(58) Field of Classification Search
CPC combination set(s) only.
See application file for complete search history.

(56) References Cited

U.S. PATENT DOCUMENTS 9,374,578 B1 6/2016 Mukherjee et al.
9,609,343 B1 3/2017 Chen et al.
(Continued)

FOREIGN PATENT DOCUMENTS

WO 2016072775 A1 5/2016

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG11 and ITU-T SG 16 WP 3); JCTVC-L1003_v34, Mar. 19, 2013, 310 pages, please consider section 8.5.3.2 5 on pp. 124 and 125, section 8.5.3 2.6 on pp. 125-128, and section 8 5.3.2.7 on pp. 128 and 129.

(Continued)

*Primary Examiner* — Jeffery A Williams
(74) *Attorney, Agent, or Firm* — Shumaker & Sieffert, P.A.

(57) ABSTRACT

Techniques are described for using an inter-intra-prediction block. A video coder may generate a first prediction block according to an intra-prediction mode and generate a second prediction block according to an inter-prediction mode. The video coder may weighted combine, such as based on the intra-prediction mode, the two prediction blocks to generate an inter-intra-prediction block (e.g., final prediction block). In some examples, an inter-intra candidate is identified in a list of candidate motion vector predictors, and an inter-intra-prediction block is used based on identification of the inter-intra candidate in the list of candidate motion vector predictors.

32 Claims, 14 Drawing Sheets

US 11,350,109 B2
Page 2

Related U.S. Application Data

(60) Provisional application No. 62/524,231, filed on Jun. 23, 2017.

(51) Int. Cl.

| | |
|---|---|
| *H04N 19/182* | (2014.01) |
| *H04N 19/107* | (2014.01) |
| *H04N 19/463* | (2014.01) |
| *H04N 19/503* | (2014.01) |
| *H04N 19/11* | (2014.01) |
| *H04N 19/124* | (2014.01) |
| *H04N 19/139* | (2014.01) |
| *H04N 19/176* | (2014.01) |
| *H04N 19/44* | (2014.01) |
| *H04N 19/593* | (2014.01) |
| *H04N 19/186* | (2014.01) |

(52) U.S. Cl.
CPC ......... *H04N 19/124* (2014.11); *H04N 19/139* (2014.11); *H04N 19/176* (2014.11); *H04N 19/182* (2014.11); *H04N 19/44* (2014.11); *H04N 19/463* (2014.11); *H04N 19/503* (2014.11); *H04N 19/513* (2014.11); *H04N 19/593* (2014.11); *H04N 19/186* (2014.11)

(56) References Cited

U.S. PATENT DOCUMENTS

| 10,757,420 | B2 | 8/2020 | Zhang et al. |
| 2018/0278942 | A1 | 9/2018 | Zhang et al. |
| 2018/0376148 | A1 | 12/2018 | Zhang et al. |
| 2019/0037213 | A1 | 1/2019 | Hermansson et al. |

OTHER PUBLICATIONS

Cha R., et al., "Improved Combined Inter-intra Prediction Using Spatial-Variant Weighted Coefficient," International Conference on Multimedia and Expo (ICME), Jul. 11, 2011, pp. 1-5, XP031964687, DOI: 10.1109/ICME.2011.6012008, ISBN: 978-1-61284-348-3, abstract.

Chen Y., et al., "A Pre-filtering Approach to Exploit Decoupled Prediction and Transform Block Structures in Video Coding," IEEE International Conference on Image Processing (ICIP), Oct. 27-30, 2014, Oct. 1, 2014, pp. 4137-4140, XP055299349.

Chen Y., et al., "Joint Inter-Intra Prediction based on Mode-variant and Edge-directed Weighting Approaches in Video Coding," IEEE International Conference on Acoustics, Speech and Signal Processing (ICASSP), May 4, 2014, pp. 7372-7376, XP032617571, [retrieved on Jul. 11, 2014], paragraphs [03.2], [03.3].

Chen J., et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, 6th Meeting; Hobart, AU, March 31-Apr. 7, 2017, Document: JVET -F1001-v3, Jun. 30, 2017, 48 Pages.

Chen J., et al., "Description of Scalable Video Coding Technology Proposal by Qualcomm (Configuration 2)", 11.JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K0036, Oct. 2, 2012 (Oct. 2, 2012), XP030112968, pp. 1-21.

Debargha M., et al., "An Overview of New Video Coding Tools Under Consideration for VP10: the Successor to VP9," Visual Communications and Image Processing, vol. 9599, Sep. 22, 2015, pp. 95991E-1 to 95991E-12, XP060060839.

International Search Report and Written Opinion—PCT/US2018/039058—ISA/EPO—Sep. 18, 2018 (175024U2WO) (16 pp).

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Kim I-K., et al., "Coding Efficiency Comparison of New Video Coding Standards: HEVC vs VP9 vs AVS2 Video," IEEE International Conference on Multimedia and Expo (ICME), Jul. 14, 2014, pp. 1-6, XP032639340, [retrieved on Sep. 3, 2014].

Non-Final Office Action from U.S. Appl. No. 16/015,005 dated Sep. 20, 2019, 15 pp.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10. 1109/TCSVT.2012.2221191, http://dx.doi.org/10.1109/TCSVT.2012.2221191.

US Prosecution for U.S. Appl. No. 16/015,027, filed Jun. 21, 2018, 58 pages.

Xin Jin et al: "Combined Inter-Intra Prediction for High Definition Video Coding (Abstract)" 26. Picture Coding Symposium;Jul. 11, 2007-Sep. 11, 2007; Lisbon,, Nov. 7, 2007 (Nov. 7, 2007), XP030080387 the whole document.

Zhang et al., "Intra-prediction Mode Propagation for Inter-pictures", Joint Video Experts Team (JVET) of ITU-T SG 16 WP 3 and ISO/IEC JTC 1/SC 29/WG 11, 1oth Meeting: San Diego, US, Apr. 10-20, 2018, No. JVET-J0053, 4 pp.

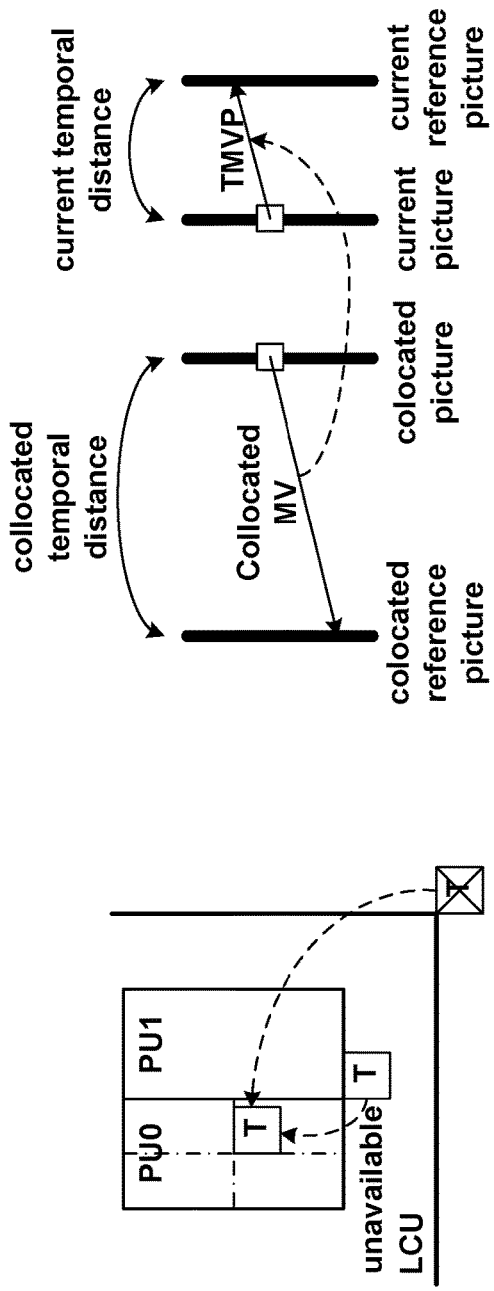
FIG. 8A
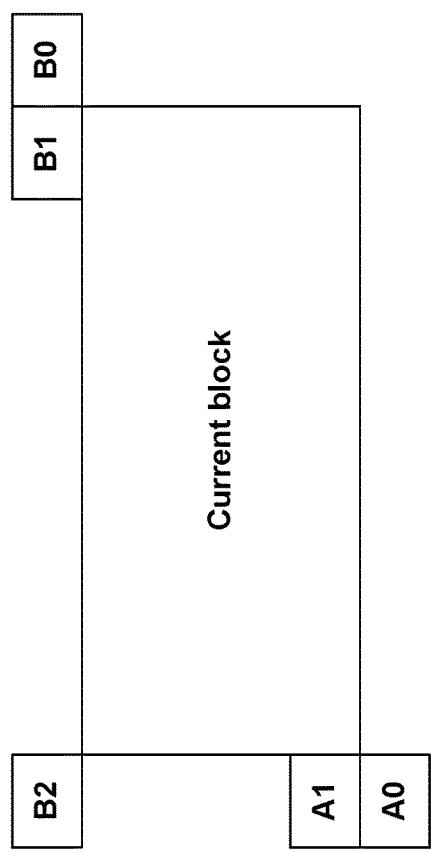
FIG. 8B
FIG. 9

COMBINATION OF INTER-PREDICTION AND INTRA-PREDICTION IN VIDEO CODING

This application is a continuation application of U.S. patent application Ser. No. 16/015,027, filed on Jun. 21, 2018, which claims the benefit of U.S. Provisional Patent Application 62/524,231, filed Jun. 23, 2017, the entire content of both of which are incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure is related to the field of coding of video signals. For example, some aspects relate to block-based prediction in video coding. In some examples, a video coder may be configured to perform inter-intra-prediction (e.g., prediction in which inter-prediction and intra-prediction are combined). In inter-intra-prediction, the video coder generates a first prediction block based on intra-prediction techniques, and a second prediction block based on inter-prediction techniques. The video coder generates a final prediction block based on a weighted combination of the first and second prediction blocks. One or more examples described in this disclosure relate to techniques for how to determine the weighting applied to generate the final prediction block.

Also, one or more examples described in this disclosure relate to techniques for constructing a merge candidate list that includes a final prediction block, also called an inter-intra candidate. In examples for constructing the merge candidate list, the final prediction block may be generated with a weighted combination of the first and second prediction blocks, but the example techniques do not require use of a weighted combination of the first and second prediction blocks for constructing the merge candidate list.

In one example, the disclosure describes a method of decoding, the method comprising determining an intra-prediction mode for a current block of a picture, determining a first weight and a second weight based on the determined intra-prediction mode, generating a first prediction block for the current block of the picture according to the intra-prediction mode, generating a second prediction block for the current block of the picture according to an inter-prediction mode, applying the first weight to the first prediction block to generate a first weighted block, applying the second weight to the second prediction block to generate a second weighted block, generating a final prediction block for the current block of the picture based on the first weighted block and second weighed block, and reconstructing the current block of the picture based on the final prediction block and a residual between the final prediction block and the current block of the picture.

In one example, the disclosure describes a method of encoding, the method comprising determining an intra-prediction mode for a current block of a picture, determining a first weight and a second weight based on the determined intra-prediction mode, generating a first prediction block for the current block of the picture according to the intra-prediction mode, generating a second prediction block for the current block of the picture according to an inter-prediction mode, applying the first weight to the first prediction block to generate a first weighted block, applying the second weight to the second prediction block to generate a second weighted block, generating a final prediction block for the current block of the picture based on the first weighted block and second weighed block, generating a residual based on the final prediction block and the current block of the picture, and signaling information indicative of the residual.

In one example, the disclosure describes a device for coding, the device comprising a memory configured to store sample values neighboring a current block of a picture and reference pictures for the current block of the picture, and a video coder comprising processing circuitry. The video coder is configured to determine an intra-prediction mode for the current block of the picture, determine a first weight and a second weight based on the determined intra-prediction mode, generate a first prediction block for the current block of the picture according to the intra-prediction mode based on the sample values stored in the memory, generate a second prediction block for the current block of the picture according to an inter-prediction mode based on a reference picture of the reference pictures stored in the memory, apply the first weight to the first prediction block to generate a first weighted block, apply the second weight to the second prediction block to generate a second weighted block, generate a final prediction block for the current block of the picture based on the first weighted block and second weighed block, and at least one of reconstruct the current block of the picture based on the final prediction block and a residual between the final prediction block and the current block of the picture, or generate the residual, and signal information indicative of the residual.

In one example, the disclosure describes a computer-readable storage medium storing instructions thereon that when executed cause one or more processors to determine an intra-prediction mode for a current block of a picture, determine a first weight and a second weight based on the determined intra-prediction mode, generate a first prediction block for the current block of the picture according to the intra-prediction mode, generate a second prediction block for the current block of the picture according to an inter-prediction mode, apply the first weight to the first prediction block to generate a first weighted block, apply the second weight to the second prediction block to generate a second weighted block, generate a final prediction block for the current block of the picture based on the first weighted block and second weighed block, and at least one of reconstruct the current block of the picture based on the final prediction block and a residual between the final prediction block and the current block of the picture, or generate the residual, and signal information indicative of the residual.

In one example, the disclosure describes a method of decoding, the method comprising constructing a list of candidate motion vector predictors for a current block, wherein constructing the list of candidate motion vector predictors comprises including an inter-prediction candidate in the list of candidate motion vector predictors, wherein the inter-prediction candidate comprises motion information of a neighboring or collocated block of the current block, and including an inter-intra candidate in the list of candidate motion vector predictors, wherein the inter-intra candidate comprises information to generate a first prediction block according to an intra-prediction mode and information to generate a second prediction block according to an inter-prediction mode. The method also includes determining that the inter-intra candidate is to be used, generating an inter-intra-prediction block based on the first prediction block and the second prediction block, and reconstructing the current block based on the inter-intra-prediction block.

In one example, the disclosure describes a method of encoding, the method comprising constructing a list of candidate motion vector predictors for a current block, wherein constructing the list of candidate motion vector predictors comprises including an inter-prediction candidate in the list of candidate motion vector predictors, wherein the inter-prediction candidate comprises motion information of a neighboring or collocated block of the current block, and including an inter-intra candidate in the list of candidate motion vector predictors, wherein the inter-intra candidate comprises information to generate a first prediction block according to an intra-prediction mode and information to generate a second prediction block according to an inter-prediction mode. The method also includes determining that the inter-intra candidate is to be used, and signaling an index value into the list of candidate motion vector predictors that identifies the inter-intra candidate in the list of candidate motion vector predictors based on the determination.

In one example, the disclosure describes a device for coding, the device comprising a memory, and a video coder comprising processing circuitry. The video coder is configured to construct a list of candidate motion vector predictors, for storage in the memory, for a current block, wherein to construct the list of candidate motion vector predictors, the video coder is configured to include an inter-prediction candidate in the list of candidate motion vector predictors, wherein the inter-prediction candidate comprises motion information of a neighboring or collocated block of the current block, and include an inter-intra candidate in the list of candidate motion vector predictors, wherein the inter-intra candidate comprises information to generate a first prediction block according to an intra-prediction mode and information to generate a second prediction block according to an inter-prediction mode. The video coder is further configured to determine that the inter-intra candidate is to be used, generate an inter-intra-prediction block based on the first prediction block and the second prediction block, and at least one of reconstruct the current block based on the inter-intra-prediction block, or signal a residual between the current block and the inter-intra-prediction block and an index value into the list of candidate motion vector predictors that identifies the inter-intra candidate in the list of candidate motion vector predictors based on the determination that the inter-intra candidate is to be used.

In one example, the disclosure describes a computer-readable storage medium storing instructions thereon that when executed cause one or more processors to construct a list of candidate motion vector predictors, for storage in the memory, for a current block, wherein to construct the list of candidate motion vector predictors, the instructions cause the one or more processors to include an inter-prediction candidate in the list of candidate motion vector predictors, wherein the inter-prediction candidate comprises motion information of a neighboring or collocated block of the current block, and include an inter-intra candidate in the list of candidate motion vector predictors, wherein the inter-intra candidate comprises information to generate a first prediction block according to an intra-prediction mode and information to generate a second prediction block according to an inter-prediction mode. The instructions also cause the one or more processors to determine that the inter-intra candidate is to be used, generate an inter-intra-prediction block based on the first prediction block and the second prediction block, and at least one of reconstruct the current block based on the inter-intra-prediction block, or signal a residual between the current block and the inter-intra-prediction block and an index value into the list of candidate motion vector predictors that identifies the inter-intra candidate in the list of candidate motion vector predictors based on the determination that the inter-intra candidate is to be used.

The details of one or more examples are set forth in the accompanying drawings and the description below. Other features, objects, and advantages will be apparent from the description, drawings, and claims.

BRIEF DESCRIPTION OF DRAWINGS

FIGS. 8A and 8B are conceptual diagrams illustrating examples of a temporal motion vector predictor (TMVP) candidate and motion vector scaling for TMVP, respectively.

FIG. 9 is a conceptual diagram illustrating an example of neighboring blocks whose spatial information is used for constructing a merge candidate list.

DETAILED DESCRIPTION

Figure 1:
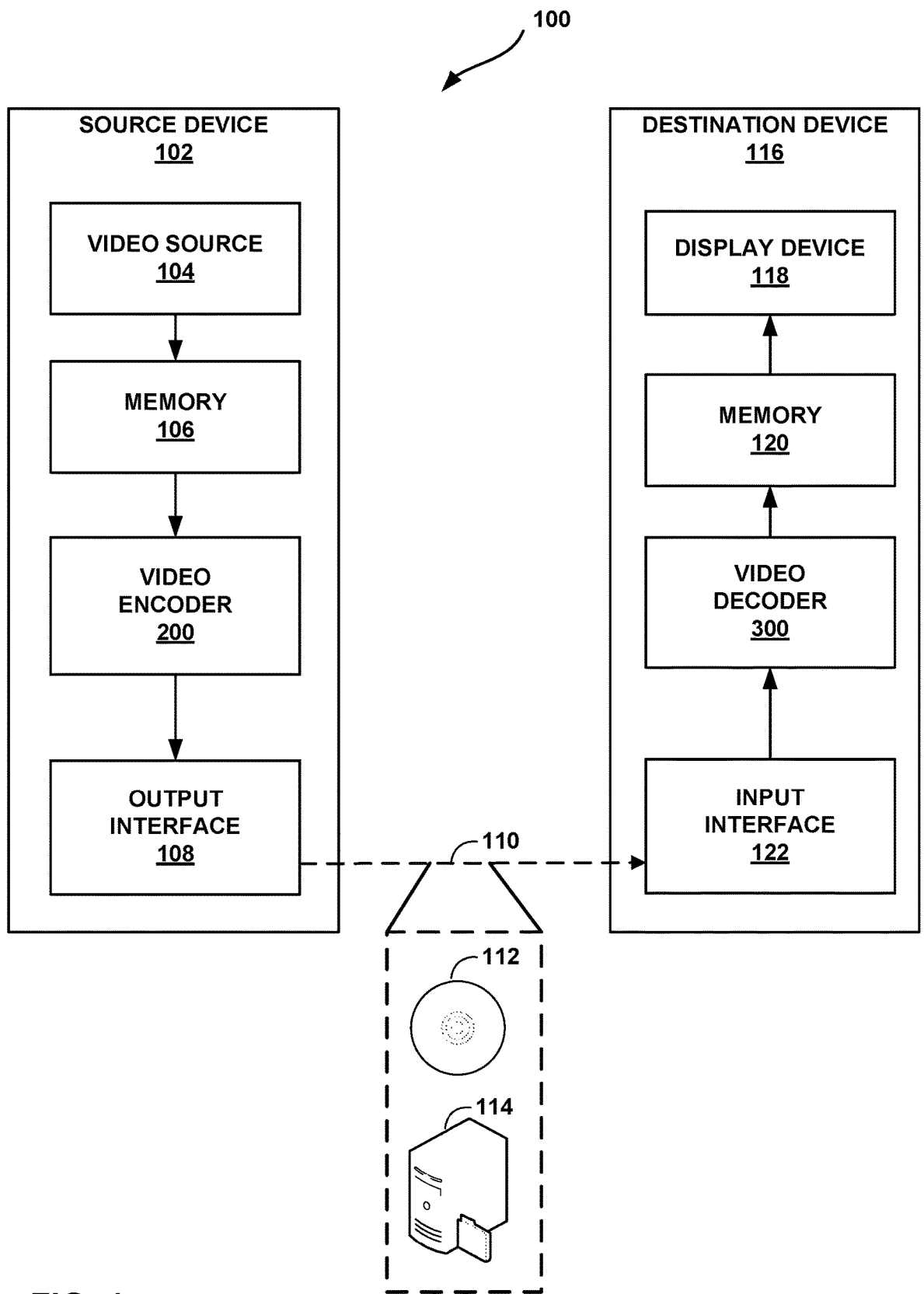
FIG. 1 is a block diagram illustrating an example video encoding and decoding system that may perform the techniques of this disclosure.

Video coding techniques include an inter-prediction mode and intra-prediction mode for encoding or decoding a current block. In an inter-prediction mode, a video coder (e.g., video encoder or video decoder) generates a prediction block in a reference picture identified by motion information (e.g., motion vector that points to the prediction block and index into reference picture list for the reference picture). A video encoder determines a residual block between the prediction block and the current block, and signals information inactive of the residual block. A video decoder receives information of the residual block, and reconstructs the current block by adding the residual block to the prediction block.

In an intra-prediction mode, a video coder generates a prediction block based on neighboring sample values. Similar to inter-prediction, a video encoder determines a residual block between the prediction block and the current block, and signals information inactive of the residual block. A video decoder receives information of the residual block, and reconstructs the current block by adding the residual block to the prediction block.

This disclosure describes examples of an inter-intra-prediction block. The inter-intra-prediction block is based on a weighted combination of the prediction block generated from an inter-prediction mode, and the prediction block generated from an intra-prediction mode. For example, a video coder generates a first prediction block for a block according to an intra-prediction mode, and generates a second prediction block for the block according to an inter-prediction mode. The video coder applies weights to the first and second prediction block to generate respective first and second weighted prediction blocks. The video coder adds the first and second weighted prediction blocks together, i.e., sums the first and second weighted prediction blocks, to generate a final prediction block, also called an inter-intra-prediction block. A video encoder determines a residual between the final prediction block and the current block, and a video decoder adds the residual to the final prediction block to reconstruct the current block.

This disclosure describes example ways in which to determine the weights that are applied to the prediction blocks generated according to an intra-prediction mode and an inter-prediction mode. As one example, there may be a plurality of intra-prediction modes (e.g., 67 different intra-prediction modes based on angles of the samples used to construct the intra-prediction block). The video coder determines an intra-prediction mode from the plurality of intra-prediction modes. The video coder may determine the weights based on the determined intra-prediction modes. For example, the video coder may determine a first weight (w1) based on the determined intra-prediction mode, and determine a second weight (w2) based on the determined intra-prediction mode. The video coder may multiply the first prediction block by w1 to generate the first weighted prediction block, and multiply the second prediction block by w2 to generate the second weighted prediction block.

Moreover, for determining whether to use the inter-intra-prediction block, the video coder constructs a list of candidate reference blocks. In some examples, the video coder may include an inter-intra candidate in the list of candidate reference blocks. The inter-intra candidate includes information to generate a first prediction block according to an intra-prediction mode and a second prediction block according to an inter-prediction mode. If the video decoder receives an index into the list of candidate reference blocks that identifies the inter-intra candidate, the video decoder generates the inter-intra-prediction block using one or more example techniques described in this disclosure. For instance, the video decoder may generate the inter-intra-prediction block using first and second weights as described above, or use other techniques that do not require weighting or that use weighting in a way other than example above.

The video decoder reconstructs the current block using the inter-intra-prediction block. This disclosure describes example techniques for including the inter-intra-prediction block in the list of candidate reference blocks.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for applying inter-intra prediction. For example, video encoder 200 and video decoder 300 may each generate an inter-intra-prediction block based on an inter-reference block (e.g., a prediction block generated from an inter-prediction mode) and an intra-reference block (e.g., a prediction block generated from an intra-prediction mode). This inter-inter-prediction block is the reference block with which video encoder 200 subtracts a current block to determine residual data that is signaled to video decoder 300, and is the reference block to which video decoder 300 adds the residual data to reconstruct the current block.

In one or more examples, video encoder 200 and video decoder 300 generate the inter-intra-prediction block based on a weighted combination of the two prediction blocks: a first prediction block generated from an inter-prediction mode, and a second prediction block generated from an intra-prediction mode. In some examples, the weights applied to the first and second prediction blocks, for the weighted combination, may be based on the intra-prediction mode. In some examples, the intra-prediction mode may determine the weight that is applied to the first prediction block, even though the first prediction block is generated from an inter-prediction mode. However, in some examples, the weight applied to the prediction block generated from the inter-prediction mode need not be based on the intra-prediction mode.

Furthermore, in some examples, video encoder 200 and video decoder 300 may construct example list of candidate motion vector predictions that identify whether the inter-intra-prediction block is used for prediction purposes. This disclosure describes one or more example techniques for how video encoder 200 and video decoder 300 may include an inter-intra candidate in one or more of the example list of candidate motion vector predictors, and when the inter-intra candidate is selected, video encoder 200 and video decoder 300 may generate an inter-intra-prediction block as a prediction block for the current block.

Source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for dynamic range adjustment. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

As described above, in addition to inter- and intra-prediction modes, in some examples, video encoder 200 and video decoder 300 may predict a block based on an inter-intra-prediction mode. In some examples of the inter-intra-prediction mode, video encoder 200 generates an inter-intra-prediction block based on a weighted combination of a first prediction block generated from an inter-prediction mode, and a second prediction block generated from an intra-prediction mode. Video encoder 200 may determine weights for each of the first and second prediction blocks based on the intra-prediction mode used to generate the intra-prediction block, as one example.

Furthermore, video encoder 200 may include an inter-intra candidate in accordance with AMVP or merge mode, as described in more detail. The inter-intra candidate includes information to generate a first prediction block according to an intra-prediction mode and information to generate a second prediction block according to an inter-prediction mode. Video encoder 200 may then generate the inter-intra-prediction block based on the first and second prediction blocks when the inter-intra candidate is selected in the AMVP or merge mode.

Following prediction, such as intra-prediction or inter-prediction of a block, or inter-intra-prediction, video encoder 200 may calculate residual data for the block. The residual data, such as a residual block, represents sample by sample differences between the block and a prediction block for the block, formed using the corresponding prediction mode (e.g., inter-intra-prediction block for inter-intra-prediction mode). Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

Following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra-prediction, inter-prediction, or inter-intra prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
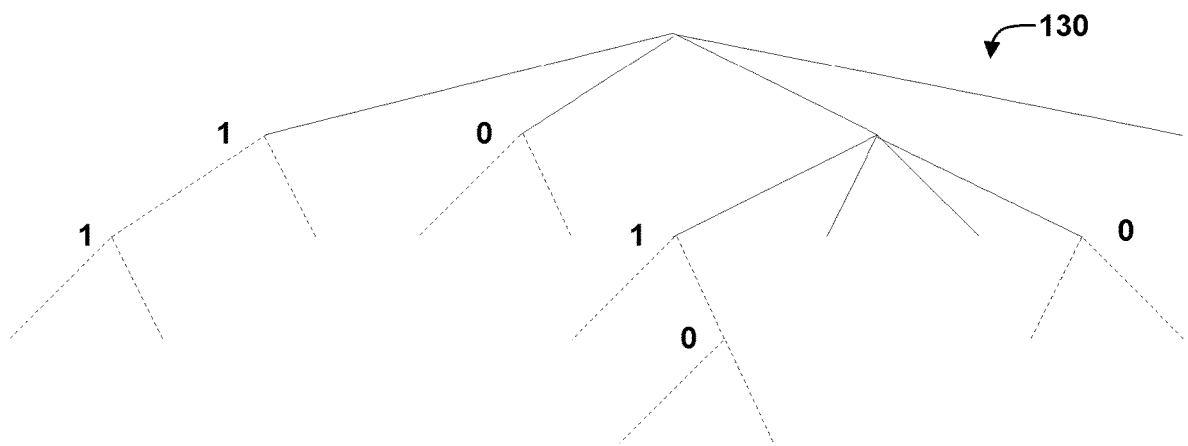
FIGS. 2A and 2B are conceptual diagrams illustrating an example quadtree binary tree (QTBT) structure, and a corresponding coding tree unit (CTU).
Figure 2B:
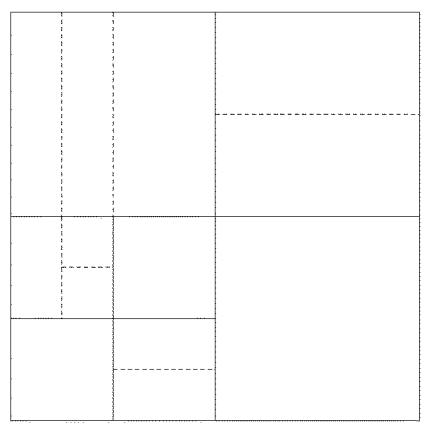

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

With the above understanding, the following further describes video coding standards, especially motion vector prediction related techniques. The following also provides further description of video coding.

The following is a description of some video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evry.fr/jct/doc_end user/documents/12_Geneva/wg11/JCTVC-L1003-v34.zip. The HEVC standard is also available as ITU-T H.265, Series H: Audiovisual and Multimedia Systems, Infrastructure of audiovisual services—Coding of moving video, High efficiency video coding, The International Telecommunication Union, April 2015, 634 pp.

Figure 3A:
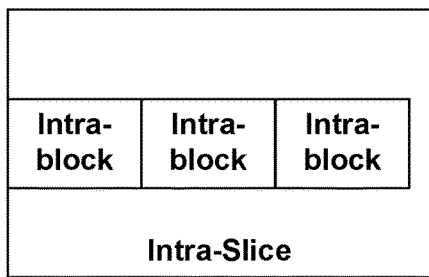
FIG. 3A is a conceptual diagram illustrating an example of blocks of an intra-predicted slice.
Figure 3B:
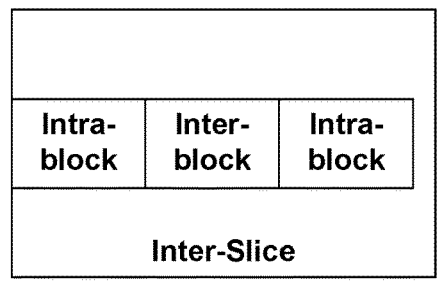
FIG. 3B is a conceptual diagram illustrating an example of blocks of an inter-predicted slice.

FIG. 3A is a conceptual diagram illustrating an example of blocks of an intra-predicted slice. FIG. 3B is a conceptual diagram illustrating an example of blocks of an inter-predicted slice.

In state-of-the-art video coding standards such as HEVC, portions of which are described in G. J. Sullivan; J.-R. Ohm; W.-J. Han; T. Wiegand (December 2012). "Overview of the High Efficiency Video Coding (HEVC) Standard" (PDF). IEEE Transactions on Circuits and Systems for Video Technology (IEEE) 22 (12), there are two kinds of frames (or slices, which are parts of frames): inter-frames and intra-frames. In an intra-frame, a block can only be coded as an intra-block. While in an inter-frame, a block can be coded as an intra-block or an inter-block. FIGS. 3A and 3B show examples of an intra-frame and an inter-frame, and particularly, intra-slices and inter-slices that are part of the respective intra-frame or inter-frame. The term "blocks" used here can refer to a coding unit/block, prediction unit/block, sub-PU, transform unit/block or any other coding structures.

A block coded as an intra-block applies intra-prediction, with which the current block is predicted by neighboring pixels in the current frame. A block coded as an inter-block applies inter-prediction, with which the current block is predicted by pixels in previously coded/decoded frames, named "reference frames". As illustrated in FIG. 3A, an intra-slice may only include intra-blocks (e.g., blocks predicted using intra-prediction). As illustrated in FIG. 3B, an inter-slice may include intra-blocks and inter-blocks (e.g., blocks predicted using intra-prediction and blocks predicted using inter-prediction).

Figure 4:
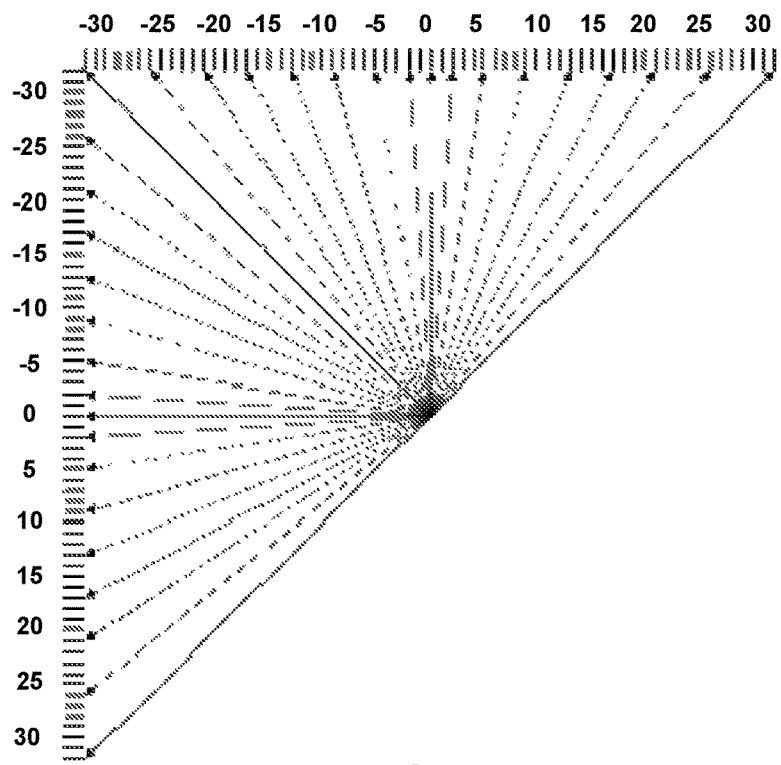
FIG. 4 is a conceptual diagram illustrating an example of intra-prediction modes.

FIG. 4 is a conceptual diagram illustrating an example of intra-prediction modes. In HEVC, there are 35 intra-prediction modes representing different prediction directions as shown in FIG. 4. For instance, there are 33 directional modes, and two special modes: DC and Planar. In JEM, such as described in J. Chen, E. Alshina, G. J. Sullivan, J.-R. Ohm, J. Boyce, JVET-F1001," Algorithm Description of Joint Exploration Test Model 6," April 2017, the number of intra-prediction modes is increased to 67. Each intra-coded block (e.g., intra-predicted block) has its intra-prediction mode information.

Figure 5:
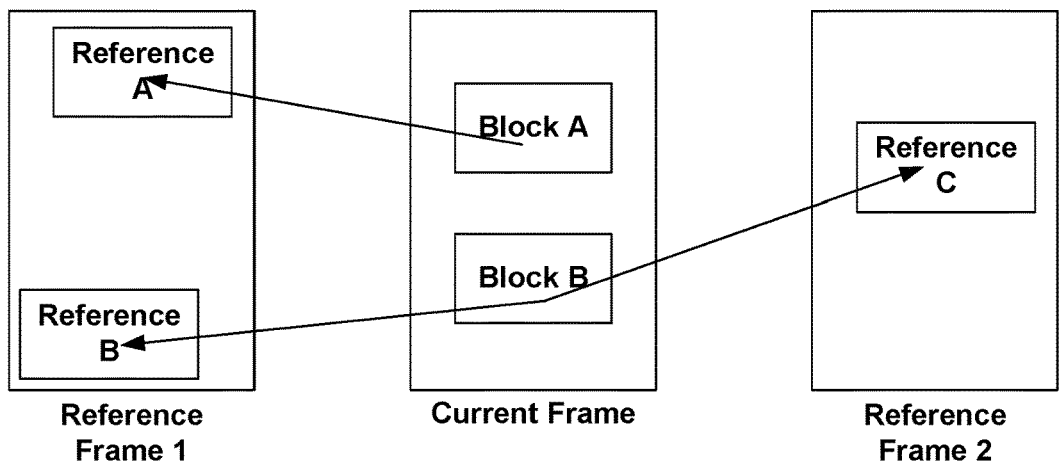
FIG. 5 is a conceptual diagram illustrating examples of reference frames for inter-prediction.

FIG. 5 is a conceptual diagram illustrating examples of reference frames for inter-prediction. For inter-prediction, motion compensation (MC) is used from one reference block (uni-prediction) or two reference blocks (bi-prediction) in reference frames as shown in FIG. 5. In FIG. 5, block A in the Current Frame utilizes uni-prediction with one reference block (Reference A in Reference Frame 1), and block B in the current frame utilizes bi-prediction with two reference blocks (Reference B in Reference Frame 1 and Reference C in Reference Frame 2). Each inter-coded block (e.g., inter-predicted block) has its motion information, including reference frame indices and motion vectors (MV).

Figure 6:
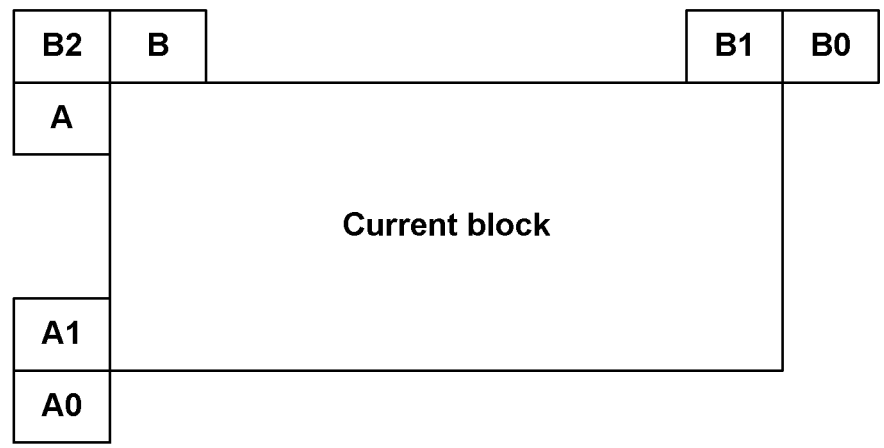
FIG. 6 is a conceptual diagram illustrating examples of neighboring blocks for a current block for coding an intra-prediction mode.

FIG. 6 is a conceptual diagram illustrating examples of neighboring blocks for a current block for coding an intra-prediction mode. To code an intra-prediction mode, intra-prediction modes of the neighboring blocks are used as prediction modes for the current mode. FIG. 6 shows exemplary neighboring blocks. In HEVC, intra-prediction modes of neighboring block A and B are used as prediction modes for the intra mode of the current block. As an example use of a prediction mode, each intra-prediction mode may be assigned a numerical value. Rather than signaling the actual intra-prediction mode, video encoder 200 signals a difference between the intra-prediction mode for the current block and the prediction mode (e.g., the intra-prediction mode determined from one or more neighboring blocks). Video decoder 300 may determine the intra-prediction mode for the current block by adding the prediction mode to the difference value signaled by video encoder 200.

There may various ways in which to determine the particular block whose intra-prediction mode becomes the prediction mode. In JEM, more neighboring blocks (A0, A1, B0, B1, B2) are used as prediction modes for the current mode. If a neighboring block does not exist (the current block is at the boundary of a frame), or a neighboring block is not intra-coded (the current frame is an inter-frame but the current block is intra-coded), the neighboring block is marked as "unavailable" and its intra-prediction mode is not used to predict the intra-prediction mode of the current block.

The following describes motion information, such as motion information for an inter-predicted block. For each block, a set of motion information can be available. The set of motion information contains motion information for forward and backward prediction directions. Here, forward and backward prediction directions are two prediction directions corresponding to reference picture list 0 (RefPicList0) and reference picture list 1 (RefPicList1) of a current picture or slice. The terms "forward" and "backward" do not necessarily have a geometry meaning. Instead, they are used to distinguish which reference picture list a motion vector is based on. Forward prediction means the prediction formed based on reference list 0, while backward prediction means the prediction formed based on reference list 1 (or vice-versa based on design choice). In case both reference list 0 and reference list 1 are used to form a prediction for a given block, it is called bi-directional prediction.

For a given picture or slice, if only one reference picture list is used, every block inside the picture or slice is forward predicted. If both reference picture lists are used for a given picture or slice, a block inside the picture or slice may be forward predicted, or backward predicted, or bi-directionally predicted.

For each prediction direction, the motion information contains a reference index and a motion vector. A reference index is used to identify a reference picture in the corresponding reference picture list (e.g. RefPicList0 or RefPicList1). A motion vector has both a horizontal and a vertical component, with each indicating an offset value along horizontal and vertical direction respectively. In some descriptions, for simplicity, the word of "motion vector" may be used interchangeably with motion information, to indicate both the motion vector and its associated reference index.

The following describes picture order count (POC) values. POC is widely used in video coding standards to identify a display order of a picture. Although there are cases where two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC, and motion vector scaling, as a few examples. For instance, POC values are used as a way to identify pictures.

The following describes the H.264/AVC video coding standard. As an example of the macroblock structure in AVC, each inter macroblock (MB) may be partitioned into four different ways
  One 16×16 MB partition
  Two 16×8 MB partitions
  Two 8×16 MB partitions
  Four 8×8 MB partitions Different MB partitions in one MB may have different reference index values for each direction (RefPicList0 or RefPicList1). When an MB is not partitioned into four 8×8 MB partitions, it has only one motion vector for each MB partition in each direction. When an MB is partitioned into four 8×8 MB partitions, each 8×8 MB partition can be further partitioned into sub-blocks, each of which can have a different motion vector in each direction. There are four different ways to get sub-blocks from an 8×8 MB partition:
  One 8×8 sub-block
  Two 8×4 sub-blocks
  Two 4×8 sub-blocks
  Four 4×4 sub-blocks Each sub-block can have a different motion vector in each direction. Therefore, motion vector is present in a level equal to higher than sub-block.

In AVC, temporal direct mode could be enabled in either MB or MB partition level for skip or direct mode in B slices. For each MB partition, the motion vectors of the block co-located with the current MB partition in the RefPicList1 [0] of the current block are used to derive the motion vectors. Each motion vector in the co-located block is scaled based on POC distances. In AVC, a direct mode can also predict motion information from the spatial neighbors.

The following provides some more information regarding the HEVC video coding standard, as well as reintroduces some concepts described above. In HEVC, the largest coding unit in a slice is called a coding tree block (CTB) or coding tree unit (CTU). A CTB contains a quad-tree the nodes of which are coding units.

The size of a CTB can be ranges from 16×16 to 64×64 in the HEVC main profile (although technically 8×8 CTB sizes can be supported). A coding unit (CU) could be the same size of a CTB although and as small as 8x8. Each coding unit is coded with one mode. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information.

The following describes motion vector prediction (MVP). In HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list may contain up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. For example, if a current block is predicted in merge mode, video encoder 200 may determine motion information from the MV candidate list and signal an index into the MV candidate list. Video decoder 300 may incorporate the motion information from candidate identified by the index into the MV candidate list as the motion information for the current block. For AMVP, video encoder 200 may signal an index into the MV candidate list, an MVD (difference between the motion vector of the motion information identified by the index into the MV candidate list and the actual motion vector for the current block), and information indicating whether reference picture list 0 or reference picture list 1 is used. The candidates for both modes are derived similarly from the same spatial and temporal neighboring blocks.

Figure 7A:
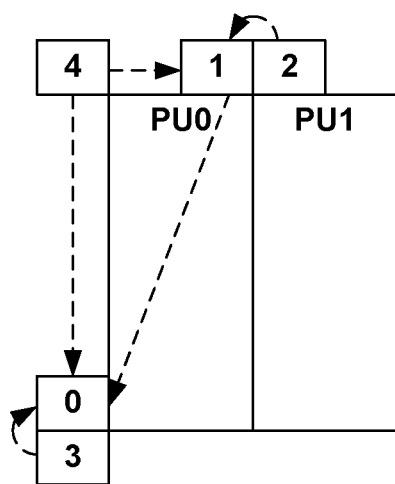
FIGS. 7A and 7B are conceptual diagrams illustrating examples of spatial neighboring motion vector candidates for merge and advanced motion vector prediction (AMVP) modes, respectively.
Figure 7B:
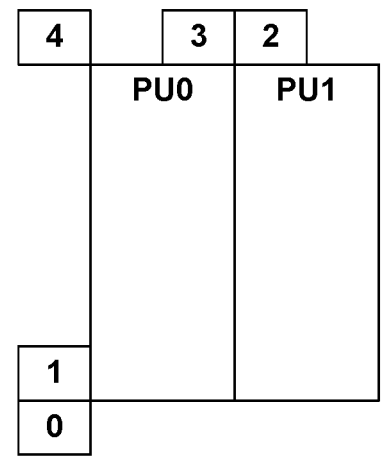

FIGS. 7A and 7B are conceptual diagrams illustrating examples of spatial neighboring motion vector candidates for merge and AMVP mode. Spatial MV candidates are derived from the neighboring blocks shown on in FIGS. 7A and 7B, for a specific PU ($PU_0$), although the methods for generating the candidates from the blocks differ for merge and AMVP modes.

In merge mode, up to four spatial MV candidates can be derived with the orders showed on FIG. 7A with numbers, and the order is the following: left (0, A1), above (1, B1), above right (2, B0), below left (3, A0), and above left (4, B2), as shown in FIG. 7A. In FIG. 7A, the arrows illustrate comparisons between motion information of neighboring blocks, and if the motion information is the same, the motion information for a block is pruned as a motion vector candidate. For instance, if above (1, B1) block has the same motion information as left (0, A1) block, then the motion information of above (1, B1) block is not included as a motion vector candidate. If above right (2, B0) block has the same motion information as above (1, B1) block, then the motion information of above right (2, B0) is not included as a motion vector candidate, and so forth.

In AVMP mode, the neighboring blocks are divided into two groups: left group consisting of the block 0 and 1, and above group consisting of the blocks 2, 3, and 4 as shown on FIG. 7B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

The following describes temporal motion vector prediction (TMVP) in HEVC. A temporal motion vector predictor (TMVP) candidate, if enabled and available, is added into the MV candidate list after spatial motion vector candidates. The process of motion vector derivation for TMVP candidate is the same for both merge and AMVP modes; however, the target reference index for the TMVP candidate in the merge mode is always set to 0.

FIGS. 8A and 8B are conceptual diagrams illustrating examples of a temporal motion vector predictor (TMVP) candidate and motion vector scaling for TMVP, respectively. The primary block location for TMVP candidate derivation is the bottom right block outside of the collocated PU as shown in FIG. 8A as a block "T", to compensate the bias to the above and left blocks used to generate spatial neighboring candidates. However, if that block is located outside of the current CTB row or motion information is not available, the block is substituted with a center block of the PU.

Motion vector for TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV may need to be scaled to compensate the temporal distance differences, as shown in FIG. 8B.

The following describes some additional aspects of motion prediction in HEVC. Several aspects of merge and AMVP modes are worth mentioning as follows. In motion vector scaling, it is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values. For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In artificial motion vector candidate generation, if a motion vector candidate list is not complete, artificial motion vector candidates are generated and inserted at the end of the list until it will have all candidates. In merge mode, there are two types of artificial MV candidates: combined Bi-prediction candidate derived only for B-slices and default fixed candidates. In some examples, only a zero candidate is used for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

In a pruning process for candidate insertion, candidates from different blocks may happen to be the same, which decreases the efficiency of a merge/AMVP candidate list. A pruning process is applied to solve this problem, as described above with respect to FIG. 7A. It compares one candidate against the others in the current candidate list to avoid inserting identical candidate in certain extent. To reduce the complexity, only limited numbers of pruning process is applied instead of comparing each potential one with all the other existing ones.

As described above, there are many priority-based candidate lists. Each candidate is inserted into the candidate list per a predefined priority. For example, in HEVC, a merge candidate list and AMVP candidate list are constructed by inserting candidates based on a predefined order (or per a predefined priority).

FIG. 9 is a conceptual diagram illustrating an example of neighboring blocks whose spatial information is used for constructing a merge candidate list. As shown in FIG. 9, the merge candidate list is constructed by video encoder 200 or video decoder 300 inserting the spatial merging candidate by a predefined order (A1→B1→B0→A0→B2).

Figure 10:
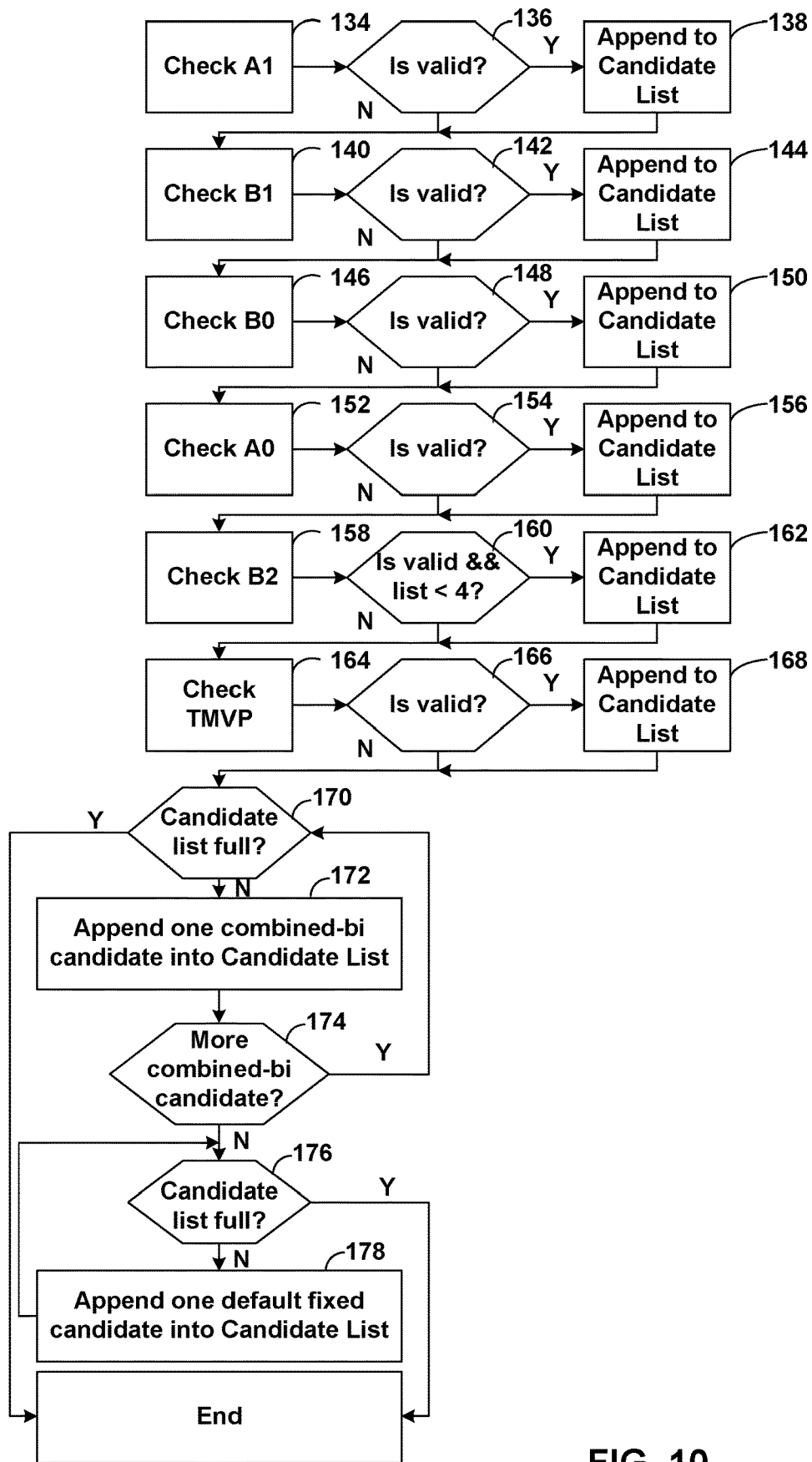
FIG. 10 is a flowchart illustrating an example manner in which to construct a merge candidate list.

FIG. 10 is a flowchart illustrating an example manner in which to construct a merge candidate list. For example, FIG. 10 shows the construction process of the merge candidate list in HEVC. Each spatial or temporal neighboring blocks are checked one by one to identify whether the block can provide a valid merge candidate. The term "valid" means the block exists, is inter-coded, the candidate list is not full, and the motion information in the block is not pruned by existing candidates in the current candidate list. It should be noted that one candidate may be only pruned to partial of existing candidates in the current candidate list. For B2, it is only checked if there are less than 4 candidates after checking A1, B1, B0 and A0. If the merge candidate list is not full after checking all spatial and temporal neighboring blocks, the artificial candidates will be stuffed to fulfill the merge candidate list. First, the combined-bi candidates is stuffed. If the list is still not full, it will be fulfilled with fixed default candidates. The term "blocks" (e.g. Block0-Block4 and Current Block in FIG. 10) used here can be coding unit/block, prediction unit/block, sub-PU, transform unit/block or any other coding structures.

For example, a video coder (e.g., one or both of video encoder 200 and video decoder 300) may check block A1 of FIG. 9 (134), and determine whether it is valid (136). If valid (Y of 136), the video coder appends motion information of A1 to the merge candidate list (138), and then proceeds to check B1. If not valid (N of 136), the video coder proceeds to check B1.

The video coder may then check B1 of FIG. 9 (140), and determine whether it is valid (142). If valid (Y of 142), the video coder appends motion information of B1 to the merge candidate list (144), and then proceeds to check B0. If not valid (N of 142), the video coder proceeds to check B0. The video coder may then check B0 of FIG. 9 (146), and determine whether it is valid (148). If valid (Y of 148), the video coder appends motion information of B0 to the merge candidate list (150), and then proceeds to check A0. If not valid (N of 148), the video coder proceeds to check A0.

The video coder may then check A0 of FIG. 9 (152), and determine whether it is valid (154). If valid (Y of 154), the video coder appends motion information of A0 to the merge candidate list (156), and then proceeds to check B2. If not valid (N of 154), the video coder proceeds to check B2.

The video coder may then check B2 of FIG. 9 (158), and determine whether it is valid and there are less than four candidates in the list (160). If valid and less than four candidates in the list (Y of 160), the video coder appends motion information of B2 to the merge candidate list (162), and then proceeds to check TMVP. If not valid or not less than four candidates in the list (N of 160), the video coder proceeds to check TMVP.

The video coder may then check the TMVP of FIG. 8A (164), and determine whether it is valid (166). If valid (Y of 166), the video coder appends motion information of the TMVP (based on scaling of FIG. 8B if needed) to the merge candidate list (168), and determines whether the candidate list full (170). If not valid (N of 166), the video coder determines whether the candidate list is full (170).

If the candidate list is full (Y of 170), the merge candidate list construction process is over. If the candidate list is not full (N of 170), the video coder adds the combined bi-candidate (172), i.e., appends the combined bi-candidate into the candidate list. The video coder may determine if more combined bi-candidates are available (174). If more bi-candidates are available (Y of 174), and the candidate list is not full (N of 170), the video coder may add another bi-candidate, and keep repeating until there are no more bi-candidates or the candidate list is not full.

If there are no more bi-candidates (N of 174), and the candidate list not full (N of 176), the video coder may append one default fixed candidate into candidate list (178). The video coder may keep adding one default fixed candidate into the merge candidate list until the merge candidate list is full (Y of 176).

This disclosure describes examples to improve the efficiency of prediction by combining inter-prediction and intra-prediction. The method of combining of inter-prediction and intra-prediction is defined as inter-intra prediction.

Video encoder 200 and video decoder 300 may be configured to perform the following methods individually. Alternatively, video encoder 200 and video decoder 300 may be configured to perform any combination of them.

Video encoder 200 and video decoder 300 may each generate a prediction block using a particular intra-prediction mode, and generate another prediction block using inter-prediction with specific motion information. Video encoder 200 and video decoder 300 may generate a final prediction block (e.g., inter-intra-prediction block) based on the two prediction block. As one example, a video coder (e.g., video encoder and/or video decoder 300) may generate a prediction block P1 for the current block using intra-prediction with a specific Intra-Prediction Mode (IPM), and another prediction block P2 for the current block using inter-prediction with specific Motion Information (MI, including information such as inter-prediction direction, reference lists, reference picture index and motion vectors).

Video encoder 200 and video decoder 300 may utilize a weighted prediction to determine the final prediction block. As one example, the video coder may generate the final prediction block (e.g., array of sample values) P as the weighted sum of P1 and P2 as the formula shown below:

$$P(x,y) = w1(x,y) \times P1(x,y) + w2(x,y) \times P2(x,y),$$

where (x, y) is the coordinate of a sample in the current block. w1 is the weighting value for P1 and w2 is the weighting value for P2.

In one example, $P(x, y)=(w1(x, y)\times P1(x, y)+w2(x, y)\times P2(x, y)+o)>>s$, where w1, w2, o and s are integers. Some constraints can be made. For example: $w1(x, y)+w2(x, y)=2^s$, $o=2^{s-1}$, and $0\leq w1(x, y)\leq 2^s$, $0\leq w2(x, y)\leq 2^s$.

In the above example, video encoder 200 and video decoder 300 determined the values of the weights (w1, w2) applied to the two prediction blocks based on certain constraints on their values. In some examples, video encoder 200 and video decoder 300 may determine the value of the weights (w1, w2) based on other factors.

As one example, video encoder 200 and video decoder 300 determine w1 and w2 based on the intra-prediction mode (IPM) used to determine the prediction block generated from an intra-prediction mode. In other words, in one example, w1 and w2 depend on IPM. Moreover, in the below examples, the determined weights w1 and w2 may be the same weight for each sample in the two prediction blocks P1 and P2, or two or more weights may be different for two or more samples in the two prediction blocks P1 and P2. For instance, in one example, to determine a first weighted prediction block and a second weighted prediction block, video encoder 200 and video decoder 300 may multiply the same w1 with each sample of P1 and multiply the same w2 with each sample of P2.

In another example, to determine a first weighted prediction block, video encoder 200 and video decoder 300 may determine a first weight value (e.g., w1_0) for sample P1(0, 0), determine a second weight value (e.g., w1_1) for sample P1(0, 1), and so forth, and multiply each respective weight value with each respective prediction sample value to determine the first weighted prediction block. In this example, it is possible that the first weight and the second weight have different values. Video encoder 200 and video decoder 300 may similarly determine a second weighted prediction block, but based on P2 and weights associated for P2 (e.g., w2_X).

In one example, each mode can have different w1 and w2, i.e., $P(x, y)=w1(x,y,IPM)\times P1(x, y)+w2(x, y, IPM)\times P2(x, y)$. In this example, video encoder 200 and video decoder 300 may determine the intra-prediction mode. Then, video encoder 200 and video decoder 300 may parse a table that indicates weight values for each of the intra-prediction modes. Video encoder 200 and video decoder 300 may determine the weight values w1 and w2 based on the weight values associated with the determined intra-prediction mode.

Accordingly, in one or more examples, a video coder (e.g., one or both of video encoder 200 and video decoder 300) may determine an intra-prediction mode for block of a picture, and determine a first weight and a second weight based on the determined intra-prediction mode. The video coder may generate a first prediction block for the block according to the intra-prediction mode, and generate a second prediction block for the block according to an inter-prediction mode.

The video coder may apply the first weight to the first prediction block to generate a first weighted block, and apply the second weight to the second prediction block to generate a second weighted block. For instance, the video coder may multiply the first weight with each sample value (e.g., where the sample value is a luma or chroma value depending on the type of block) in the first prediction block to generate the first weighted prediction block, and multiply the second weight with each sample in the second prediction block to generate the second weighted prediction block. The first weight and the second weight may be the same for each sample in the first and second prediction blocks, respectively. In some examples, the video coder may determine the first weight and the second weight on a sample-by-sample basis (or plurality of samples-by-plurality of samples basis), such as based on positions of the samples in the respective first and second prediction blocks.

The video coder may generate a final prediction block based on the first weighted block and the second weighted block. As one example, the video coder may add the first weighted prediction block and the second weighted prediction block to generate the final prediction block.

Video encoder 200 may generate a residual block based on a difference between the final prediction block and the current block, and signal information indicative of the residual block. Video decoder 300 may receive information indicative of the residual block and add the residual block to the final prediction block to reconstruct the block of picture.

In the above example, each intra-prediction mode was assigned its own weights. For instance, for a first intra-prediction mode, there may be a first w1 and a first w2 assigned weights. For a second intra-prediction mode, there may be a second w1 and a second w2 assigned weights, and so forth. The first and second assigned weights may be different. However, rather than assigning weights to each intra-prediction mode, the intra-prediction modes may be classified into groups, and a w1 and w2 weight may be assigned to each of the groups (e.g., for the whole prediction block, on a sample-by-sample basis, or on a plurality of samples-by-plurality of samples basis). In this way, less memory may be needed, as there may be fewer weight values to store.

Accordingly, in one example, intra-prediction modes are classified into groups. Each group can have different w1 and w2, i.e., $P(x, y)=w1(x, y, Group(IPM))\times P1(x, y)+w2(x, y, Group(IPM))\times P2(x, y)$.

In one implementation, intra-prediction modes are classified by grouping the intra angular prediction modes that have similar directions. For example, there are 67 modes in the JEM software, which can be classified into 16 groups as $$Group\ (IPM) = \begin{cases} 0, & \text{if } IPM = 0 \\ 1, & \text{if } IPM = 1 \\ 2, & \text{if } 2 \leq IPM \leq 5 \\ 3, & \text{if } 6 \leq IPM \leq 11 \\ 4, & \text{if } 12 \leq IPM \leq 16 \\ 5, & \text{if } 17 \leq IPM \leq 19 \\ 6, & \text{if } 20 \leq IPM \leq 25 \\ 7, & \text{if } 26 \leq IPM \leq 31 \\ 8, & \text{if } 32 \leq IPM \leq 34 \\ 9, & \text{if } 35 \leq IPM \leq 36 \\ 10, & \text{if } 37 \leq IPM \leq 42 \\ 11, & \text{if } 43 \leq IPM \leq 48 \\ 12, & \text{if } 49 \leq IPM \leq 51 \\ 13, & \text{if } 52 \leq IPM \leq 57 \\ 14, & \text{if } 58 \leq IPM \leq 63 \\ 15, & \text{if } 64 \leq IPM \leq 66 \end{cases}$$

Accordingly, in the above example, a video coder may determine an intra-prediction mode classification based on the intra-prediction mode. For example, the video coder may determine, from a plurality of ranges, a range within which the intra-prediction mode resides. The plurality of ranges may be based on angles associated with prediction directions of corresponding intra-prediction modes. The video coder may determine the intra-prediction mode classification based on the determined range. The video coder may determine the first weight for the first prediction block (e.g., prediction block generated from an intra-prediction mode) and the second weight for the second prediction block (e.g., prediction block generated from an inter-prediction block) based on the intra-prediction mode classification.

As one example, assume that the intra-prediction mode (IPM) value is 22. In this example, the video coder may determine that the intra-prediction mode value is within the range of 20≤IPM≤25, in the above example where the ranges are based on angles associated with prediction directions. The video coder may determine that the group classification for the intra-prediction mode is 8 because 8 is associated with range of 20≤IPM≤25. The video coder may determine the weights w1 and w2 based on the intra-prediction mode classification of 8, and generate the first and second weighted prediction blocks to generate the final prediction block.

In one example, w1 and w2 are only dependent on the IPM (intra-prediction mode). Alternatively, w1 and w2 are dependent on the IPM and coordinate (i.e., (x, y)). In other words, as described above, the video coder may determine respective first weights and second weights (e.g., respective values for w1 and w2) for each sample in the respective first and second prediction blocks (e.g., respective ones of P1 and P2) based on the intra-prediction mode and a location of each sample in the respective first and second prediction blocks. Alternatively, furthermore, w1 and w2 may be dependent on the block size and block shape.

In one example, the video coder may determine the first weight and the second weight based on a polynomial equation having values defined by the intra-prediction mode and one or more coefficients. For instance, w1 and w2 can be calculated from x, y, using polynomial calculation.

In one example, w1(x,y, Group(IPM))=a(Group(IPM))×x+b(Group(IPM))×y+c(Group(IPM)), and w2(x, y, Group (IPM))=1−w1(x,y, Group(IPM)). This example may be implemented with all integer coefficients, such as w1(x,y, Group(IPM))=(a(Group(IPM))×x+b(Group(IPM))×y+c (Group(IPM))+>>s, and w2(x, y, Group(IPM))=$2^s$−w1(x,y, Group(IPM)), where a(Group(IPM)), b(Group(IPM)), c(Group(IPM)), o and s are integers.

Parameters a(Group(IPM)), b(Group(IPM)) and c(Group (IPM)) can be predefined at both video encoder 200 and video decoder 300. Alternatively, they can be signaled from video encoder 200 to video decoder 300. Alternatively, there can be several predefined parameters at both video encoder 200 and video decoder 300. Video encoder 200 can signal an index to video decoder 300 to indicate which parameters are used.

There may be some constraints. For example, o=$2^{s-1}$, 0≤w1(x,y)≤$2^s$, 0≤w2(x, y)≤$2^s$, and 0≤a(Group(IPM)), b(Group(IPM)), c(Group(IPM))≤$2^k$, where k is an integer.

In one example, w1(x,y, Group(IPM))=a(Group(IPM))× $x^2$+b(Group(IPM))×$y^2$+c(Group(IPM))×x×y+d(Group (IPM))×x+e(Group(IPM))×y+f (Group(IPM)), and w2(x, y, Group(IPM))=1−w1(x, y, Group(IPM)). It can be implemented in an integrated form w1(x, y, Group(IPM))=(a (Group(IPM))×$x^2$+b(Group(IPM))×$y^2$+c(Group(IPM))×x× y+d(Group(IPM))×x+e(Group(IPM))×y+f (Group(IPM))+ o)>>s, and w2(x, y, Group(IPM))=$2^s$−w1(x, y, Group (IPM)), where a(Group(IPM)), b(Group(IPM)), c(Group (IPM)), d(Group (IPM)), e (Group (IPM)), f (Group(IPM)), o and s are integers.

Parameter a(Group (IPM)), b(Group(IPM)), c (Group (IPM)), d (Group(IPM)), e (Group(IPM)) and f (Group (IPM)) can be predefined at both video encoder 200 and video decoder 300. Alternatively, they can be signaled from video encoder 200 to video decoder 300. Alternatively, there can be several predefined parameters at both video encoder 200 and video decoder 300. Video encoder 200 can signal an index to video decoder 300 to indicate which parameters are used. Some constraints can be made. For example, o=$2^{s-1}$, 0≤w1(x, y)≤$2^s$, 0≤w2(x, y)≤$2^s$, and 0≤a(Group (IPM)), b(Group (IPM)), c(Group(IPM)), d(Group (IPM)), e (Group (IPM)), f (Group (IPM))≤$2^k$, where k is an integer.

In the above, intra-prediction mode is used to determine the weighting that is applied to generate weighted prediction blocks. In addition, in some examples, video encoder 200 and video decoder 300 may determine motion information (MI) of an inter-intra-prediction block. For instance, the MI is the MI used to determine the prediction block used to construct the inter-intra-prediction block. In one example, MI of an inter-intra-prediction block is signaled or derived as that in an inter-coded block or merge block, and/or IPM of an inter-intra-prediction block is derived in the way of intra-prediction mode propagation as specified in U.S. patent application Ser. No. 15/926,550, filed Mar. 20, 2018.

For instance, in one example, the intra-prediction mode of the collocated block in the collocated frame will be treated as the intra-prediction mode of the current inter-coded block. The collocated block in the collocated frame can be located in the same way as is done for temporal motion vector prediction (TMVP) in HEVC and JEM, except that the collocated frame is allowed to be an intra-frame. The collocated picture can be selected from the reference pictures of the current picture. In one example, the reference picture with reference index 0 in the reference picture list 0 (or 1) is used as a collocated picture. Alternatively, the selection of collocated frame can be signaled from video encoder 200 to video decoder 300, or it can be derived implicitly at video decoder 300. In another example, the intra-prediction mode of the reference block in the reference frame will be treated as the intra-prediction mode of the current inter-coded block. The reference block in the reference frame is located with the motion vector (MV) information as used in motion compensation in HEVC, JEM or any existing or video coding system. There can be more than one reference block for the current inter-coded block. In still another example, the intra-prediction mode of a spatially neighboring block will be treated as the intra-prediction mode of the current inter-coded block.

In one example, IPM of an inter-intra-prediction block is signaled or derived as that in an intra-coded block, and/or MI of an inter-intra-prediction block is derived in the way of motion information propagation as specified in Application Ser. No. 62/525,075, filed Jun. 26, 2017. The IPM of an inter-intra-prediction block refers to the IPM used to determine the prediction block based on an intra-prediction mode that is used to generate the inter-intra-prediction block.

For instance, embodiments may include propagating motion information to intra-coded blocks in an inter-picture. Then intra-coded blocks can be used for motion vector prediction. For example, intra-coded blocks can be used in the construction of candidate lists such as merging candidate list and AMVP list for a lately coded block. An intra-coded block inherits motion information from spatially and/or temporally neighboring blocks, wherein the neighboring blocks can be intra-coded and/or inter-coded. A priority-based method may be defined to select motion information from neighboring blocks. When an intra-coded block chooses to inherit the motion information from a neighboring block, an inter-coded neighboring block has a higher priority than an intra-coded neighboring block.

In one example, chroma components as well as the luma component can use inter-intra prediction. In one example, chroma components and luma component choose to use inter-intra prediction or not synchronically, i.e., in a block either all components use inter-intra prediction or none of them uses inter-intra prediction. Alternatively, components choose to use inter-intra prediction or not asynchronously, i.e., it is allowed that one component use inter-intra prediction in a block but another component does not use inter-intra prediction in the same block.

Accordingly, the block being coded (e.g., encoded or decoded) includes a luma component block and chroma component block. In one example, the video coder generates both a final luma prediction block and a final chroma prediction block based on first and second weights applied to respective luma and chroma components of the first and second prediction blocks (e.g., of P1 and P2). In one example, the video coder generates only a final luma prediction block or a final chroma prediction block based on first and second weights applied to only one of respective luma and chroma components of the first and second prediction blocks.

In one example, chroma components and luma component may share the same MI and IPM when using inter-intra prediction. Or chroma components and a luma component may have different MI and IPM when using inter-intra prediction. For example, MI is derived as that in an inter-coded block or merge block and is shared by the luma and chroma components. For the luma component, IPM is derived in the way of intra-prediction mode propagation as specified in application Ser. No. 15/926,550, filed Mar. 20, 2018. But for the Chroma component, IPM is always the LM mode defined in "Algorithm Description of Joint Exploration Test Model 6." Alternatively, for the Chroma component, IPM is always the MMLM mode defined in "Algorithm Description of Joint Exploration Test Model 6."

In one example, a flag named inter-intra-prediction-flag is signaled from video encoder 200 to video decoder 300 to indicate whether the combination of intra-prediction and inter-prediction is applied in a block. Alternatively, an index of prediction methods may be signaled. In one example, the prediction methods may include but are not limited to intra-prediction, inter-prediction, inter-intra prediction.

The above described various examples for determining the final prediction block (e.g., inter-intra-prediction block) based on weighted combination of a first prediction block generated according to an intra-prediction mode, and a second prediction block generated according to an inter-prediction mode. The following describes additional example techniques that may be utilized with the inter-intra-prediction.

In one example, no explicit flag is signaled from video encoder 200 to video decoder 300 to indicate whether the combination of intra-prediction and inter-prediction is applied in a block (e.g., no explicit signaling is needed to indicate whether prediction is with an inter-intra-prediction block). Instead, video encoder 200 and video decoder 300 can operate in the same way to determine whether the combination of intra-prediction and inter-prediction is applied in a block (e.g., whether inter-intra-prediction block is to be used as the final prediction block).

For example, some candidates in a merge candidate list are utilized to indicate the combination of intra-prediction and inter-prediction is used for the current block. In this method, additional candidates (representing inter-intra prediction mode) are added into the merge candidate list in addition to the existing merge candidates (representing inter prediction mode with copied or derived motion information).

Candidates representing inter-intra prediction mode (also called inter-intra candidates) refer to information used to generate an inter-intra-prediction block including sample values of the inter-intra-prediction block. For instance, video encoder 200 and video decoder 300 include an inter-intra candidate, and the inter-intra candidate includes information to generate a first prediction block according to an intra-prediction mode and information to generate a second prediction block according to an inter-prediction.

Video encoder 200 and video decoder 300 may generate the inter-intra-prediction block using the first and second prediction blocks according to any of the example techniques described above, or may use any other technique to generate an inter-intra-prediction block. Hence, in this disclosure, when an inter-intra candidate is described as being inserted or added to a list of candidates (e.g., merge candidate list or AMVP candidate list), such description may be considered as meaning that video encoder 200 and video decoder 300 include the motion information and intra-prediction mode used to generate the first and second prediction blocks, and the first and second prediction blocks are used to generate the inter-intra-prediction block.

There may be various ways in which video encoder 200 and video decoder 300 may determine the motion information and intra-prediction mode for the inter-intra candidate. For instance, the motion information and/or intra-prediction mode may be signaled, or may be determined (e.g., derived without signaling) based on motion information and/or intra-prediction mode of one or more neighboring blocks. There may be other ways in which the motion information and intra-prediction mode of the inter-intra candidate may be determined, and the techniques are not limited to the above examples.

In one example, one or more inter-intra candidates are inserted into merge candidate list. When an inter-intra candidate is selected for the current merge-coded block, inter-intra prediction is used in the block. For example, assume that the inter-intra candidate is located in index[1] in the list of candidates. In this example, video encoder 200 may signal the index value of 1 into the list of candidates. Video decoder 300 may determine that based on the value of 1 into the list of candidates, the inter-intra-prediction block is used as the prediction block (e.g., video decoder 300 will generate the inter-intra-prediction block using the motion information and the intra-prediction mode information of the inter-intra candidate).

Figure 13:
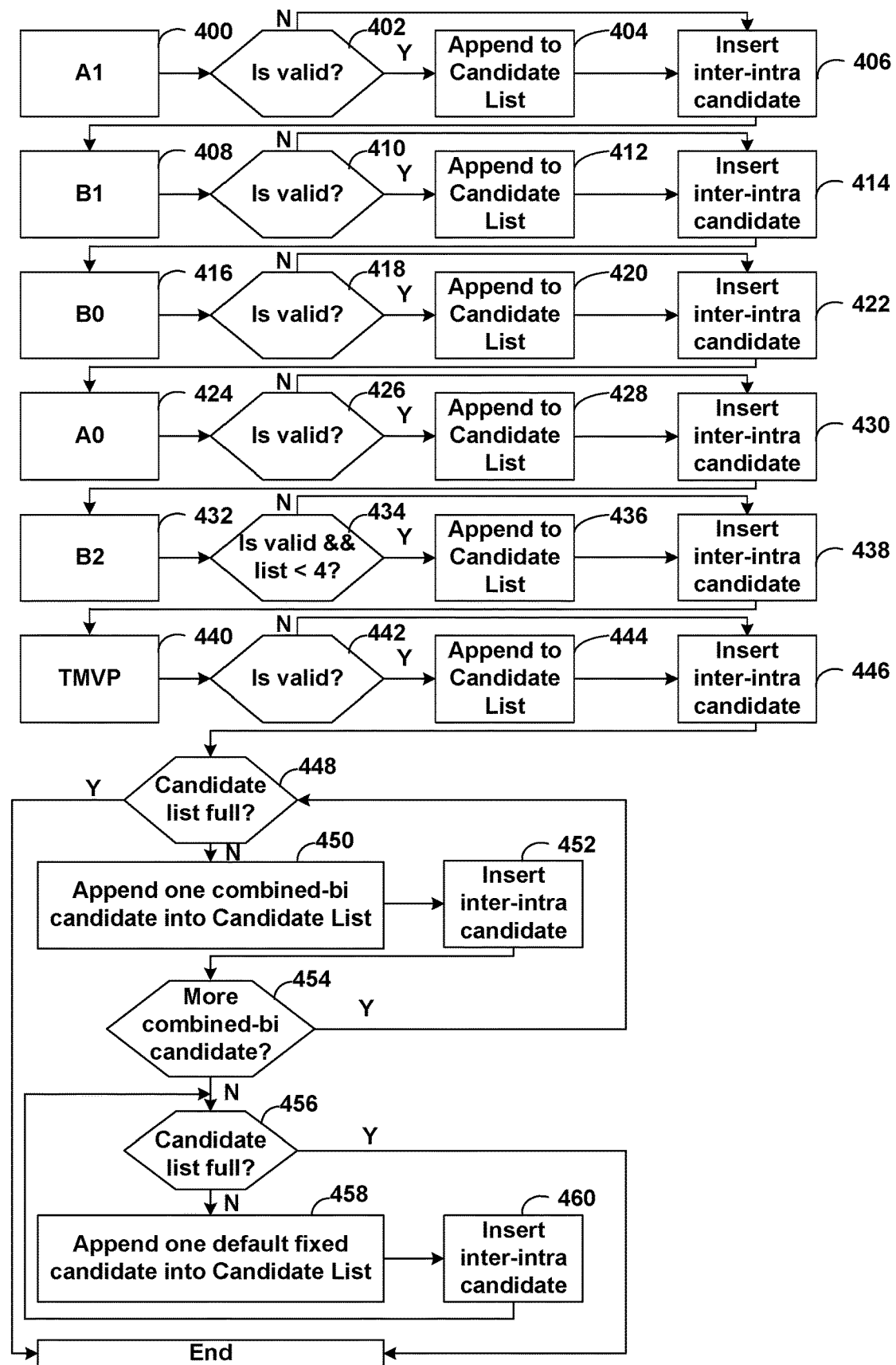
FIG. 13 is a flowchart illustrating an example manner in which to construct a merge candidate list that includes inter-intra-candidates.
Figure 14:
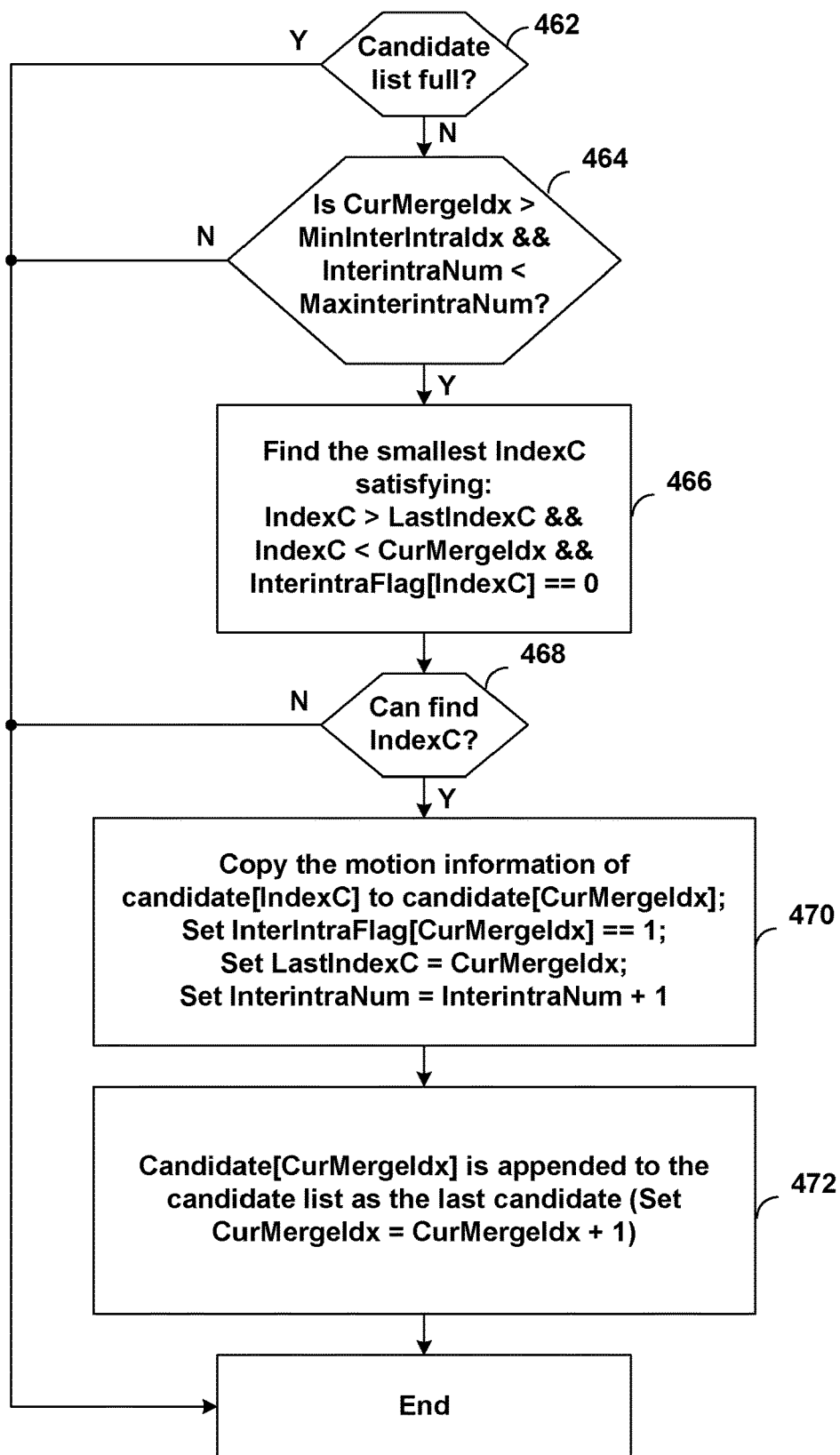
FIG. 14 is a flowchart illustrating another example manner in which to construct a merge candidate list that includes inter-intra-candidates.

FIG. 13 is a flowchart illustrating an example manner in which to construct a merge candidate list that includes inter-intra-candidates. FIG. 14 is a flowchart illustrating another example manner in which to construct a merge candidate list that includes inter-intra-candidates. For example, FIGS. 13 and 14 shows an example of inserting inter-intra candidates into merge candidate list. FIG. 13 shows that a procedure of inserting an inter-intra candidate is invoked after each normal merge candidate is checked. For instance, FIG. 13 is similar to FIG. 10; however, an inter-intra candidate is appended after each normal merge candidate is checked.

For example, a video coder (e.g., one or both of video encoder 200 and video decoder 300) may check block A1 of FIG. 9 (400), and determine whether it is valid (402). If valid (Y of 402), the video coder appends motion information of A1 to the merge candidate list (404). If not valid (N of 402) or after appending to the merge candidate list (404), the video coder may insert an inter-intra candidate (406).

The video coder may then check B1 of FIG. 9 (408), and determine whether it is valid (410). If valid (Y of 410), the video coder appends motion information of B1 to the merge candidate list (412). If not valid (N of 410) or after appending to the merge candidate list (412), the video coder may insert an inter-intra candidate (414).

The video coder may then check B0 of FIG. 9 (416), and determine whether it is valid (418). If valid (Y of 418), the video coder appends motion information of B0 to the merge candidate list (420). If not valid (N of 418) or after appending to the merge candidate list (420), the video coder may insert an inter-intra candidate (422).

The video coder may then check A0 of FIG. 9 (424), and determine whether it is valid (426). If valid (Y of 426), the video coder appends motion information of A0 to the merge candidate list (428). If not valid (N of 426) or after appending to the merge candidate list (428), the video coder may insert an inter-intra candidate (430).

The video coder may then check B2 of FIG. 9 (432), and determine whether it is valid (434). If valid and there are less than four entries (e.g., due to pruning described above with respect to FIG. 7A) in the merge candidate list (Y of 434), the video coder appends motion information of B2 to the merge candidate list (436). If not valid or not less than four entries (N of 434) or after appending to the merge candidate list (436), the video coder may insert an inter-intra candidate (438).

The video coder may then check the TMVP of FIG. 8A (440), and determine whether it is valid (442). If valid (Y of 442), the video coder appends motion information of the TMVP (based on scaling of FIG. 8B if needed) to the merge candidate list (444). If not valid (N of 442) or after appending to the merge candidate list (444), the video coder may insert an inter-intra candidate (446).

The video may then determine whether the candidate list is full (448). If the candidate list is full (Y of 448), the merge candidate list construction process is over. If the candidate list is not full (N of 448), the video coder adds the combined bi-candidate (450), and may insert an inter-intra candidate (452). The video coder may determine if more combined bi-candidates are available (454). If more bi-candidates are available (Y of 454), and the candidate list is not full (N of 448), the video coder may add another bi-candidate and insert another inter-intra candidate, and keep repeating until there are no more bi-candidates or the candidate list is not full.

If there are no more bi-candidates (N of 454), and the candidate list not full (N of 456), the video coder may add one default fixed candidate into candidate list (458) and insert an inter-intra candidate (460). The video coder may keep adding one default fixed candidate and an inter-intra candidate into the merge candidate list until the merge candidate list is full (Y of 456).

In the example of FIG. 13, the inter-intra candidates that are inserted may be the same inter-intra candidates or two or more of the inter-intra candidates may be different. For instance, video encoder 200 and video decoder 300 may use different weighting or no weighting, or use different starting prediction blocks generated according to inter-prediction mode and intra-prediction mode that are used to generate the inter-intra-prediction block. Also, although FIG. 13 shows that an inter-intra candidate is inserted after every regular candidate is added to the merge candidate list, the techniques are not so limited. For example, if the video coder inserts an inter-intra candidate once, the video coder may not insert another inter-intra candidate.

FIG. 14 shows an exemplary procedure of inserting an inter-intra candidate. The variable lastIndexC represents the index of the last merge candidate using inter-intra prediction and it is initialized to be −1. InterIntraFlag[k] represents whether the merge candidate with the candidate k uses inter-intra prediction (InterIntraFlag[k]=1) or not (InterIntraFlag[k]=0) and InterIntraFlag[k]is initialized to be 0 for all k E [0, MaxMergNum−1], where maxMergeNum is the size of the merge candidate list. CurMergeIdx is the index of merge candidate to be appended into the merge candidate list. After a new candidate is appended into the merge candidate list, CurMergeIdx is set to be CurMergeIdx+1. MinInterintraIdx represents the allowed smallest merge index for a merge candidate using inter-intra prediction. InterIntraNum represents the allowed number of merge candidates using inter-intra prediction.

For example, the video coder may determine whether the merge candidate list is full (462). If the merge candidate list is full (Y of 462), the merge candidate list construction process ends. If the merge candidate list is not full (N of 462), the video coder may determine whether CurMergeIdx is less than MinInterintraIdx and InterintraNum is less than MaxinterintraNum (464). If CurMergeIdx is not less than MinInterintraIdx or InterintraNum is not less than MaxinterintraNum (N of 464), then the merge candidate list construction process ends.

If CurMergeIdx is less than MinInterintraIdx and InterintraNum is less than MaxinterintraNum (Y of 464), the video coder may find the smallest IndexC that satisfies the following conditions: IndexC is greater than LastIndexC, IndexC is less than CurMergeIdx, and InterintraFlag[IndexC] is equal to 0 (466). The video coder may determine whether such a value of IndexC that satisfies the above conditions can be found (468). If IndexC cannot be found (N of 468), the merge candidate list construction process ends.

If IndexC can be found (Y of 468), then the video coder may perform the following operations. The video coder may copy the motion information of candidate[IndexC] to candidate[CurMergeIdx]. The video coder may set the value of InterIntraFlag[CurMergeIdx] equal to one. The video coder may set the value of LastIndexC equal to CurMergeIdx, and set the value of InterintraNum equal to InterintraNum plus 1 (470). The video coder may then append candidate[CurMergeIdx] to the candidate list as the last candidate (i.e., set CurMergeIdx equal to CurMergeIdx plus 1) (472). The merge candidate construction process may then end, or in some examples, the video coder may again determine whether the merge candidate list is full (462), and repeat the example operations of FIG. 14 until the merge candidate list is full.

As shown in FIG. 14, a merge candidate using inter-intra prediction can share the same MI as its preceding merge candidate, for instance where the video coder copies motion information as described with respect to reference numeral (470). In the example of FIG. 14, a merge candidate using inter-intra prediction copies the MI from a preceding merge candidate not using inter-intra prediction which has not been copied from.

For instance, in FIG. 14, video encoder 200 and video decoder 300 may determine motion information of an inter-predicted block identified by a smallest index in the list of candidate motion vector predictors to determine the information to generate a prediction block according to an inter-prediction mode (e.g., copy the motion information of the inter-predicted block identified by the smallest index). Video encoder 200 and video decoder 300 may generate a prediction block based on the motion information. Video encoder 200 and video decoder 300 may then generate an inter-intra-prediction block based on this generated prediction block.

In some examples, MinInterintraIdx can be a fixed predefined number at both video encoder 200 and video decoder 300, or it can be signaled from video encoder 200 to video decoder 300, such as in video parameter set (VPS), sequence parameter set (SPS), picture parameter set (PPS), slice header, coding tree unit (CTU), or coding unit (CU). InterIntraNum can be a fixed predefined number at both video encoder 200 and video decoder 300, or it can be signaled from video encoder 200 to video decoder 300, such as in video parameter set (VPS), sequence parameter set (SPS), picture parameter set (PPS), slice header, coding tree unit (CTU), or coding unit (CU).

In some examples, MinInterintraIdx and/or InterIntraNum may depend on previously coded information. For example, MinInterintraIdx can depend on the temporal layer of the current picture. MinInterintraIdx may be larger for a slice with a higher temporal layer.

In one example, video encoder 200 and video decoder 300 may utilize previously coded information to determine whether to use inter-intra-prediction and/or the way to signal the inter-intra-prediction-flag. For example, if the current block is coded with the Frame-rate-up-conversion (FRUC) mode, inter-intra-prediction-flag is signaled to indicate whether to use inter-intra-prediction or not. If the current block is coded with HEVC-like merge mode, inter-intra-prediction-flag is not signaled, and it is derived from the merge index implicitly whether to use inter-intra-prediction. If the current block is coded with HEVC-like advanced motion vector prediction (AMVP) mode, inter-intra-prediction cannot be used and inter-intra-prediction-flag is not signaled.

A flag can be signaled from video encoder 200 to video decoder 300, such as in video parameter set (VPS), sequence parameter set (SPS), picture parameter set (PPS), slice header, coding tree unit (CTU), or coding unit (CU) to indicate whether inter-intra prediction can be used. If this flag is 0, then block-level inter-intra prediction is disabled ("disabled" means there is no inter-intra prediction flag block-level and no implicitly derived inter-intra prediction such as an inter-intra merge candidate).

There may be a constraint on inter-intra prediction. Inter-intra prediction may be always disabled for blocks with certain coding tools. For example, inter-intra prediction may be disabled when a block uses illumination compensation (IC) prediction. In another example, inter-intra prediction will be disabled when a block uses affine prediction. In this case (e.g., where affine prediction is used), there may be no need for video encoder 200 to signal to video decoder 300 the usage of inter-intra prediction method for those blocks with IC or affine prediction.

In some examples, inter-intra prediction may be always disabled for blocks with certain sizes. Moreover, the intra prediction applied in inter-intra prediction can be combined with other coding tools. For example, PDPC can be applied to planar prediction used in inter-intra prediction.

Accordingly, in some examples, a video coder (e.g., video encoder 200 or video decoder 300) may construct a list of candidate motion vector predictors for a current block. Examples of the list of candidate motion vector predictors include a merge candidate list and an AMVP candidate list.

To construct the list of candidate motion vector predictors, the video coder includes an inter-prediction candidate in the list candidate motion vector predictors. An example of the inter-prediction candidate is motion information of a neighboring or collocated block of the current block. For instance, inter-prediction candidate may include the motion information of one of blocks A0, A1, B0, B1, or B2 illustrated in FIG. 9 or a collocated block such as block T illustrated in FIG. 8A.

To construct the list of candidate motion vector predictors, the video coder includes an inter-intra candidate in the list of candidate motion vector predictors. The inter-intra candidate include information to generate a first prediction block according to an intra-prediction mode and information to generate a second prediction block according to an inter-prediction mode. The video coder generates the inter-intra-prediction block based on the first and second prediction blocks. For instance, the video coder may utilize any of the above example techniques to generate an inter-intra-prediction block (e.g., based on a weighted combination or otherwise).

The video coder may determine that the inter-intra candidate is to be used as the prediction block for the current block. For example, video encoder 200 may determine a residual between the current block and the prediction block, and signal information indicative of the residual. Video decoder 300 may add the prediction block to received residual block to reconstruct the current block.

Because the inter-intra-prediction candidate is part of the list of candidate motion vector predictors, video encoder 200 may not need to signal any additional information indicating that the current block is predicted in an inter-intra-prediction mode (e.g., predicted with an inter-intra-prediction block). Rather, by signaling an index into the list of candidate motion vector predictors, video encoder 200 can use the inter-intra-prediction mode. For example, when video decoder 300 accesses the inter-intra candidate in the list of motion vector predictors based on the received index into the list of motion vector predictors, video decoder 300 may determine that the current block is predicted using the inter-intra-prediction block because the inter-intra candidate is identified by the index. This way, the list of candidate motion vector predictors is leveraged to also be the way in which video decoder 300 can determine that a current block is predicted using an inter-intra-prediction block without needing any separate signaling from video encoder 200 indicating that inter-intra-prediction mode is enabled for the current block.

In some examples, the video coder may include the inter-prediction candidate in to the list of candidate motion vector predictors after including the inter-prediction candidate. For example, as illustrated in the flowchart of FIG. 13, the video coder may first append motion information for one of blocks A1, B1, B0, A0, B2, or the TMVP, and after appending motion information of one of these blocks into the list of candidate motion vector predictors, the video coder may insert an inter-intra candidate.

In some examples, the video coder may determine the smallest index where inter-intra candidate can be included (e.g., MinInterIntraIdx), and the video coder may include the inter-intra candidate in the list of candidate motion vector predictors based on the determined smallest index where the inter-intra candidate can be included. In some examples, the video coder may determine the maximum number of allowable inter-intra candidates (e.g., InterIntraNum), and the video coder may include the inter-intra candidate in the list of candidate motion vector predictors based on the determined maximum number of allowable inter-intra candidates. In some examples, the video coder may copy motion information of the inter-prediction candidate as motion information of the inter-intra candidate.

Figure 11:
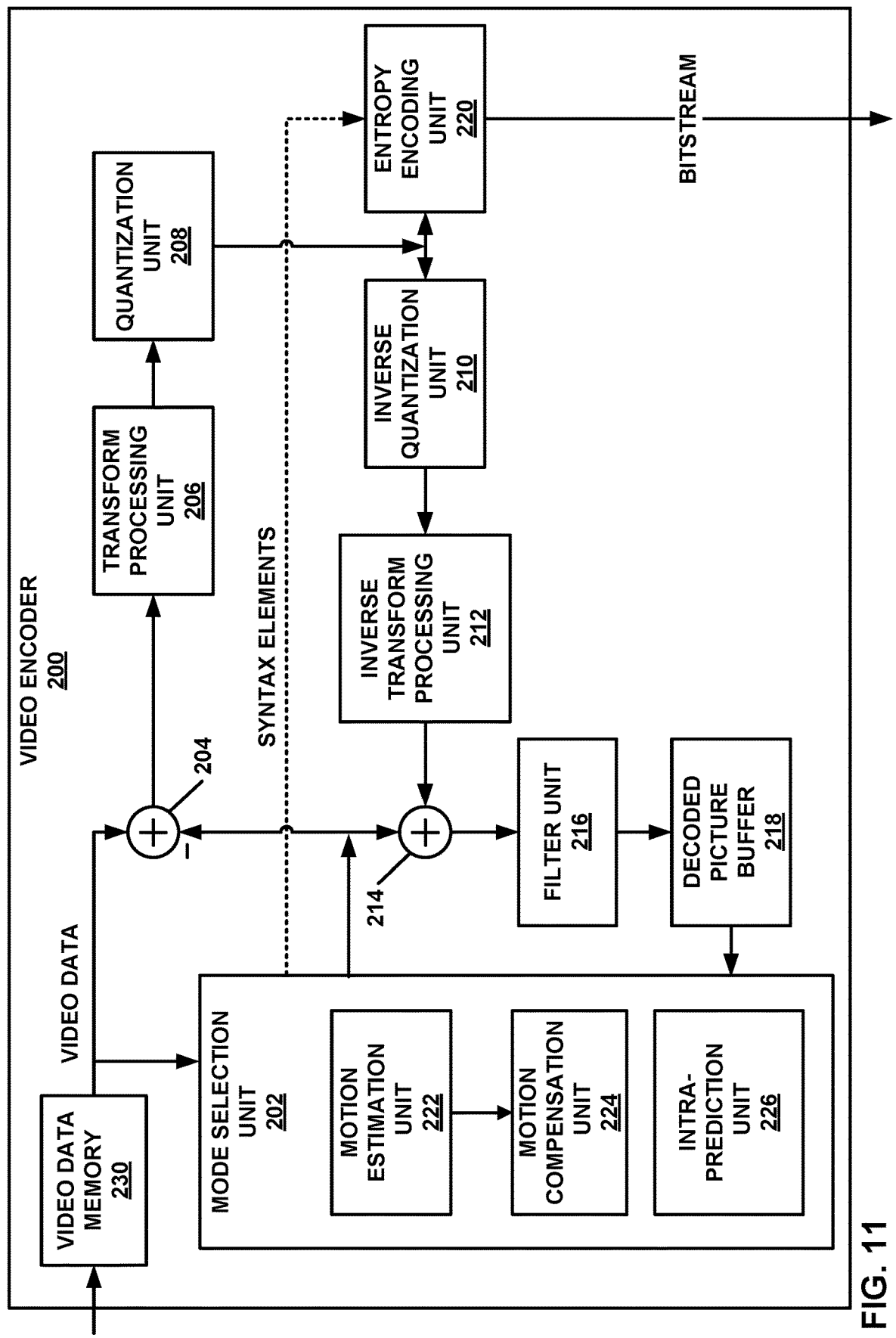
FIG. 11 is a block diagram illustrating an example video encoder that may perform the techniques of this disclosure.

FIG. 11 is a block diagram illustrating an example video encoder 200 that may perform the techniques of this disclosure. FIG. 11 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding. Video encoder 200 is an example of processing circuitry (e.g., fixed-function, programmable, or a combination of fixed-function and programmable) configured to perform one or more example techniques described in this disclosure.

In the example of FIG. 11, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 11 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like.

Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as inter-intra-prediction mode, an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform example techniques described in this disclosure.

For example, mode selection unit 202 of video encoder 200 may be configured to perform the example techniques described in this disclosure. However, the example techniques may be performed by other components or other components in combination with mode selection unit 202.

As one example, a memory, such as video data memory 230, DPB 218, and/or memory 106 (FIG. 1), may be configured to store reference pictures and sample values of neighboring samples of a block in a picture. Mode selection unit 202 may be configured to generate an inter-intra-prediction block (e.g., final prediction block) using the reference pictures and neighboring sample values stored in the memory.

For instance, mode selection unit 202 may determine an intra-prediction mode for the block of the picture (e.g., one of the modes illustrated in FIG. 4). Mode selection unit 202 may determine a first weight and a second weight based on the determined intra-prediction mode, to be applied to respective ones of a first prediction block generated according to an intra-prediction mode and a second prediction block generated according to an inter-prediction mode. As one example, the memory may store information indicating the weights associated with each intra-prediction mode, and mode selection unit 202 may parse the memory to determine the first weight and the second weight.

As another example, the memory may store information indicating the weights associated with a classification of the intra-prediction mode, and mode selection unit 202 may parse the memory to determine the first weight and the second weight based on the classification. For example, mode selection unit 202 may determine an intra-prediction mode classification based on the intra-prediction mode. To determine the intra-prediction mode, mode selection unit 202 may determine, from a plurality of ranges, a range within which the intra-prediction mode resides. The plurality of ranges may be based on angles associated with prediction directions of corresponding intra-prediction modes. Mode selection unit 202 may then determine the intra-prediction mode classification based on the determined range. Mode selection unit 202 may determine the first weight and the second weight based on the determined intra-prediction mode classification.

As another example, the first weight and the second weight may be based also on respective locations of sample values of prediction blocks generated from inter- and intra-prediction mode techniques. For instance, in a first prediction block generated according to an intra-prediction mode, a first sample located at (0, 0) may be assigned a corresponding weight value, a second sample located at (0, 1) may be assigned a corresponding weight value, and so forth. The corresponding weight values may also be based on the intra-prediction mode. Similarly, in a second prediction block generated according to an inter-prediction mode, a first sample located at (0, 0) may be assigned a corresponding weight value, a second sample located at (0, 1) may be assigned a corresponding weight value, and so forth. The corresponding weight values may also be based on the intra-prediction mode.

As another example, mode selection unit 202 may determine the first weight and the second weight based on a polynomial equation having values defined by the intra-prediction mode and one or more coefficients. The one or more coefficients may only be integers. Examples of the polynomial equation are given above.

In some examples, mode selection unit 202 may be configured to construct a candidate list that includes an inter-intra candidate. For example, mode selection unit 202 may construct a list of candidate motion vector predictors, for storage in the memory, for a current block. To construct the list of candidate motion vector predictors, mode selection unit 202 may include an inter-prediction candidate in the list of candidate motion vector predictors. The inter-prediction candidate includes motion information of a neighboring or collocated block of the current block. The flowchart of FIG. 13 illustrates examples of neighboring or collocated blocks that are included in the list of candidate motion vector predictors.

Mode selection unit 202 may also include an inter-intra candidate in the list of candidate motion vector predictors. The inter-intra candidate includes information to generate a first prediction block according to an intra-prediction mode and information to generate a second prediction block according to an inter-prediction mode.

Mode selection unit 202 may determine that the inter-intra candidate is to be used as the prediction block for the current block. Mode selection unit 202 may signal an index value into the list of candidate motion vector predictors that identifies the inter-intra candidate in the list of candidate motion vector predictors.

Figure 12:
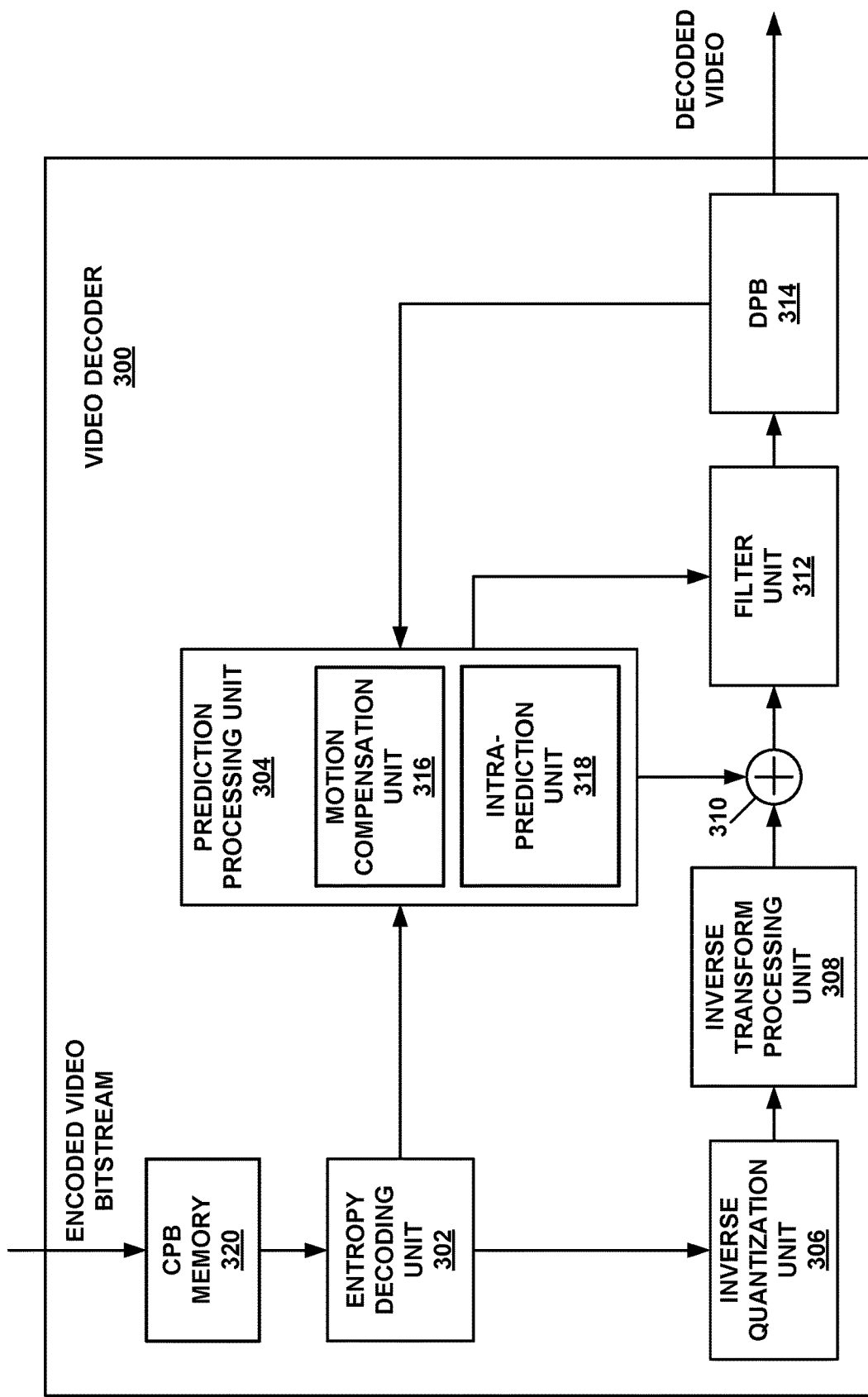
FIG. 12 is a block diagram illustrating an example video decoder that may perform the techniques of this disclosure.

FIG. 12 is a block diagram illustrating an example video decoder 300 that may perform the techniques of this disclosure. FIG. 12 is provided for purposes of explanation and is not limiting on the techniques as broadly exemplified and described in this disclosure. Video decoder 300 is an example of processing circuitry (e.g., fixed-function, programmable, or a combination of fixed-function and programmable) configured to perform one or more example techniques described in this disclosure.

For purposes of explanation, this disclosure describes video decoder 300 is described according to the techniques of JEM and HEVC. However, the techniques of this disclosure may be performed by video coding devices that are configured to other video coding standards.

In the example of FIG. 12, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 12 are illustrated to assist with understanding the operations performed by video decoder 300. The units may be implemented as fixed-function circuits, programmable circuits, or a combination thereof. Similar to FIG. 11, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 11).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 11). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to perform the example operations described in this disclosure.

For example, prediction processing unit 304 of video decoder 300 may be configured to perform the example techniques described in this disclosure. However, the example techniques may be performed by other components or other components in combination with prediction processing unit 304.

As one example, a memory, such as CPB memory 320, DPB 314, and/or memory 120 (FIG. 1), may be configured to store reference pictures and sample values of neighboring samples of a block in a picture. Prediction processing unit 304 may be configured to generate an inter-intra-prediction block (e.g., final prediction block) using the reference pictures and neighboring sample values stored in the memory.

For instance, prediction processing unit 304 may determine an intra-prediction mode for the block of the picture (e.g., one of the modes illustrated in FIG. 4) based on signaled information. Prediction processing unit 304 may determine a first weight and a second weight based on the determined intra-prediction mode, to be applied to respective ones of a first prediction block generated according to an intra-prediction mode and a second prediction block generated according to an inter-prediction mode. As one example, the memory may store information indicating the weights associated with each intra-prediction mode, and prediction processing unit 304 may parse the memory to determine the first weight and the second weight.

As another example, the memory may store information indicating the weights associated with a classification of the intra-prediction mode, and prediction processing unit 304 may parse the memory to determine the first weight and the second weight based on the classification. For example, prediction processing unit 304 may determine an intra-prediction mode classification based on the intra-prediction mode. To determine the intra-prediction mode, prediction processing unit 304 may determine, from a plurality of ranges, a range within which the intra-prediction mode resides. The plurality of ranges may be based on angles associated with prediction directions of corresponding intra-prediction modes. Prediction processing unit 304 may then determine the intra-prediction mode classification based on the determined range. Prediction processing unit 304 may determine the first weight and the second weight based on the determined intra-prediction mode classification.

As another example, the first weight and the second weight may be based also on respective locations of sample values of prediction blocks generated from inter- and intra-prediction mode techniques. For instance, in a first prediction block generated according to an intra-prediction mode, a first sample located at (0, 0) may be assigned a corresponding weight value, a second sample located at (0, 1) may be assigned a corresponding weight value, and so forth. The corresponding weight values may also be based on the intra-prediction mode. Similarly, in a second prediction block generated according to an inter-prediction mode, a first sample located at (0, 0) may be assigned a corresponding weight value, a second sample located at (0, 1) may be assigned a corresponding weight value, and so forth. The corresponding weight values may also be based on the intra-prediction mode.

As another example, prediction processing unit 304 may determine the first weight and the second weight based on a polynomial equation having values defined by the intra-prediction mode and one or more coefficients. The one or more coefficients may only be integers. Examples of the polynomial equation are given above.

In some examples, prediction processing unit 304 may be configured to construct a candidate list that includes an inter-intra candidate. In some examples, prediction processing unit 304 may be configured to construct a candidate list that includes an inter-intra candidate. For example, prediction processing unit 304 may construct a list of candidate motion vector predictors, for storage in the memory, for a current block. To construct the list of candidate motion vector predictors, prediction processing unit 304 may include an inter-prediction candidate in the list of candidate motion vector predictors. The inter-prediction candidate includes motion information of a neighboring or collocated block of the current block. The flowchart of FIG. 13 illustrates examples of neighboring or collocated blocks that are included in the list of candidate motion vector predictors.

Prediction processing unit 304 may also include an inter-intra candidate in the list of candidate motion vector predictors. The inter-intra candidate includes information to generate a first prediction block according to an intra-prediction mode and information to generate a second prediction block according to an inter-prediction mode.

Prediction processing unit 304 may reconstruct the current block based on the inter-intra candidate. For example, prediction processing unit 304 may add values of the prediction block (e.g., inter-intra-prediction block) to values of a residual block signaled by video encoder 200 to reconstruct the current block.

Figure 15:
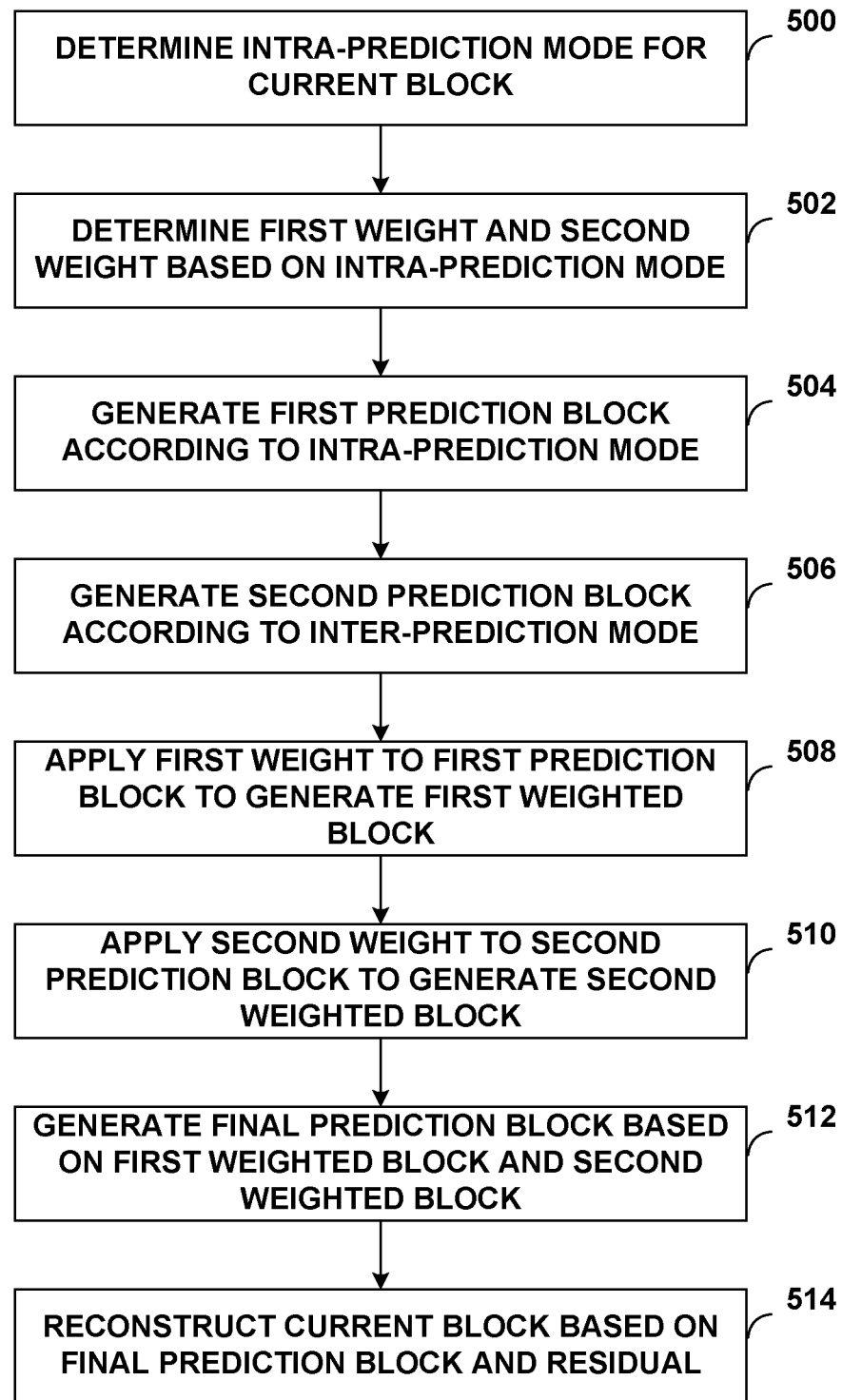
FIG. 15 is a flowchart illustrating an example method of decoding video data.

FIG. 15 is a flowchart illustrating an example method of decoding video data. As illustrated, in FIG. 15, video decoder 300 may determine an intra-prediction mode for a current block of a picture (500). For instance, video decoder 300 may receive information from the bitstream that indicates an intra-prediction mode. As another example, video decoder 300 may determine an intra-prediction mode for the current block based on intra-prediction modes of neighboring blocks.

Video decoder 300 may determine a first weight and a second weight based on the determined intra-prediction mode (502). As described above and further below, the first weight and second weight may be for applying to a first prediction block generated according to the intra-prediction mode, or a second prediction block generated according to an inter-prediction mode.

As one example, for each intra-prediction mode, there may be associated values for the first weight and the second weight, and video decoder 300 may determine the first weight and second weight based on associated values. As another example, video decoder 300 may determine an intra-prediction mode classification based on the intra-prediction mode. For instance, video decoder 300 may determine, from a plurality of ranges, a range within which the intra-prediction mode resides, and determine the intra-prediction mode classification based on the determined range. Video decoder 300 may determine the first weight and the second weight based on the determined intra-prediction mode classification.

In some examples, video decoder 300 may determine respective first weights and second weights for each sample in the respective first and second prediction blocks based on the intra-prediction mode and a location of each sample in the respective first and second prediction blocks. For instance, for each sample in the respective first and second prediction blocks, video decoder 300 may determine respective first and second weights. The respective first and second weights may be based on the location of the respective samples in the first and second prediction blocks and based on the intra-prediction mode. In some examples, the first and second weights may be the same for all samples in the first and second prediction blocks.

In some examples, video decoder 300 may determine the first weight and the second weight based on a polynomial equation having values defined by the intra-prediction mode and one or more coefficients. The one or more coefficients are integers in some examples.

Video decoder 300 may generate a first prediction block for the current block of the picture according to the intra-prediction mode (504). For example, video decoder 300 may generate a prediction block based on the neighboring sample values, stored in memory, where which neighboring sample values to use is defined by the intra-prediction mode.

Video decoder 300 may generate a second prediction block for the current block of the picture according to an inter-prediction mode (506). For example, video decoder 300 may determine a motion vector and a reference picture based on received information or based on motion information of neighboring blocks. Video decoder 300 may retrieve, from memory, a prediction block from the reference picture identified by the motion vector.

Video decoder 300 may apply the first weight to the first prediction block to generate a first weighted block (508). For example, video decoder 300 may multiply the first weight with each sample in the first prediction block to generate the first weighted block. As described above, the first weight may be the same for each sample in the first prediction block, or two or more of the samples in the first prediction block may have different first weights (e.g., such as where the value of the first weight is based on the location of the sample in the first prediction block).

Video decoder 300 may apply the second weight to the second prediction block to generate a second weighted block (510). For example, video decoder 300 may multiply the second weight with each sample in the second prediction block to generate the second weighted block. As described above, the second weight may be the same for each sample in the second prediction block, or two or more of the samples in the second prediction block may have different first weights (e.g., such as where the value of the second weight is based on the location of the sample in the second prediction block).

Video decoder 300 may generate a final prediction block for the current block of the picture based on the first weighted block and the second weighted block (512) (e.g., sum of the first and second weighted blocks). The final prediction block may also be referred to as an inter-intra-prediction block. In one example, video decoder 300 may add the first weighted block and the second weighted block to generate the final prediction block.

As described above, the current block may include a luma component and a chroma component. In some examples, to generate the final prediction block, video decoder 300 may generate both a final luma prediction block and a final chroma prediction block based on the first and second weights applied to respective luma and chroma components of the first and second prediction blocks. In some examples, to generate the final prediction block, video decoder 300 may generate only a final luma prediction block or a final chroma prediction block based on the first and second weights applied to only one of respective luma and chroma components of the first and second prediction blocks.

Video decoder 300 may reconstruct the current block of the picture based on the final prediction block and a residual between the final prediction block and the current block of the picture (514). For example, video decoder 300 may generate a residual block based on information received in the bitstream. Video decoder 300 may add the residual block to the final prediction block to reconstruct the current block of the picture.

Figure 16:
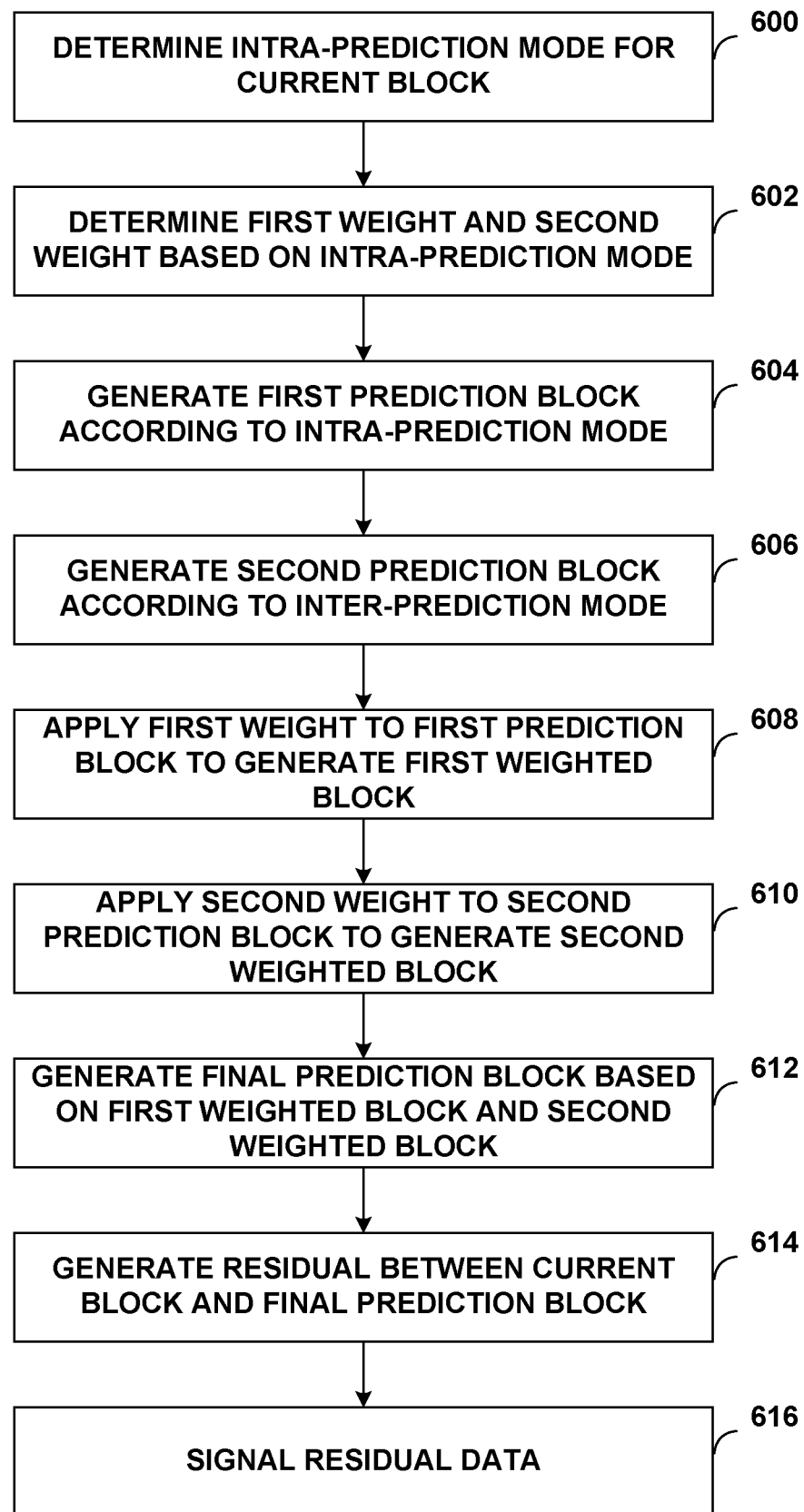
FIG. 16 is a flowchart illustrating an example method of encoding video data.

FIG. 16 is a flowchart illustrating an example method of encoding video data. As illustrated, in FIG. 16, video encoder 200 may determine an intra-prediction mode for a current block of a picture (600). For instance, video encoder 200 may construct different prediction blocks for respective intra-prediction modes and determine which one of the intra-prediction modes provides the best quality as the intra-prediction mode. As another example, video encoder 200 may determine the intra-prediction mode based on intra-prediction modes of neighboring blocks.

Video encoder 200 may determine a first weight and a second weight based on the determined intra-prediction mode (602). As described above and further below, the first weight and second weight may be for applying to a first prediction block generated according to the intra-prediction mode, or a second prediction block generated according to an inter-prediction mode.

As one example, for each intra-prediction mode, there may be associated values for the first weight and the second weight, and video encoder 200 may determine the first weight and second weight based on associated values. As another example, video encoder 200 may determine an intra-prediction mode classification based on the intra-prediction mode. For instance, video encoder 200 may determine, from a plurality of ranges, a range within which the intra-prediction mode resides, and determine the intra-prediction mode classification based on the determined range. Video encoder 200 may determine the first weight and the second weight based on the determined intra-prediction mode classification.

In some examples, video encoder 200 may determine respective first weights and second weights for each sample in the respective first and second prediction blocks based on the intra-prediction mode and a location of each sample in the respective first and second prediction blocks. For instance, for each sample in the respective first and second prediction blocks, video encoder 200 may determine respective first and second weights. The respective first and second weights may be based on the location of the respective samples in the first and second prediction blocks and based on the intra-prediction mode. In some examples, the first and second weights may be the same for all samples in the first and second prediction blocks.

In some examples, video encoder 200 may determine the first weight and the second weight based on a polynomial equation having values defined by the intra-prediction mode and one or more coefficients. The one or more coefficients are integers in some examples.

Video encoder 200 may generate a first prediction block for the current block of the picture according to the intra-prediction mode (604). For example, video encoder 200 may generate a prediction block based on the neighboring sample values, stored in memory, where which neighboring sample values to use is defined by the intra-prediction mode.

Video encoder 200 may generate a second prediction block for the current block of the picture according to an inter-prediction mode (606). For example, video encoder 200 may determine a motion vector and a reference picture based on which combination of motion vector and reference picture provides the best quality or based on motion information of neighboring blocks. Video encoder 200 may retrieve, from memory, a prediction block from the reference picture identified by the motion vector.

Video encoder 200 may apply the first weight to the first prediction block to generate a first weighted block (608). For example, video encoder 200 may multiply the first weight with each sample in the first prediction block to generate the first weighted block. As described above, the first weight may be the same for each sample in the first prediction block, or two or more of the samples in the first prediction block may have different first weights (e.g., such as where the value of the first weight is based on the location of the sample in the first prediction block).

Video encoder 200 may apply the second weight to the second prediction block to generate a second weighted block (610). For example, video encoder 200 may multiply the second weight with each sample in the second prediction block to generate the second weighted block. As described above, the second weight may be the same for each sample in the second prediction block, or two or more of the samples in the second prediction block may have different first weights (e.g., such as where the value of the second weight is based on the location of the sample in the second prediction block).

Video encoder 200 may generate a final prediction block for the current block of the picture based on the first weighted block and the second weighted block (612). The final prediction block may also be referred to as an inter-intra-prediction block. In one example, video encoder 200 may add the first weighted block and the second weighted block together to generate the final prediction block.

As described above, the current block may include a luma component and a chroma component. In some examples, to generate the final prediction block, video encoder 200 may generate both a final luma prediction block and a final chroma prediction block based on the first and second weights applied to respective luma and chroma components of the first and second prediction blocks. In some examples, to generate the final prediction block, video encoder 200 may generate only a final luma prediction block or a final chroma prediction block based on the first and second weights applied to only one of respective luma and chroma components of the first and second prediction blocks.

Video encoder 200 may generate a residual block based on the final prediction block and the current block (614). For example, video encoder 200 may subtract the values of the final prediction block from the values of the current block to generate the residual block. Video encoder 200 may then signal information indicative of the residual block (616). For example, video encoder 200 may DCT transform, quantize, and entropy encode the information indicative of the residual block.

Figure 17:
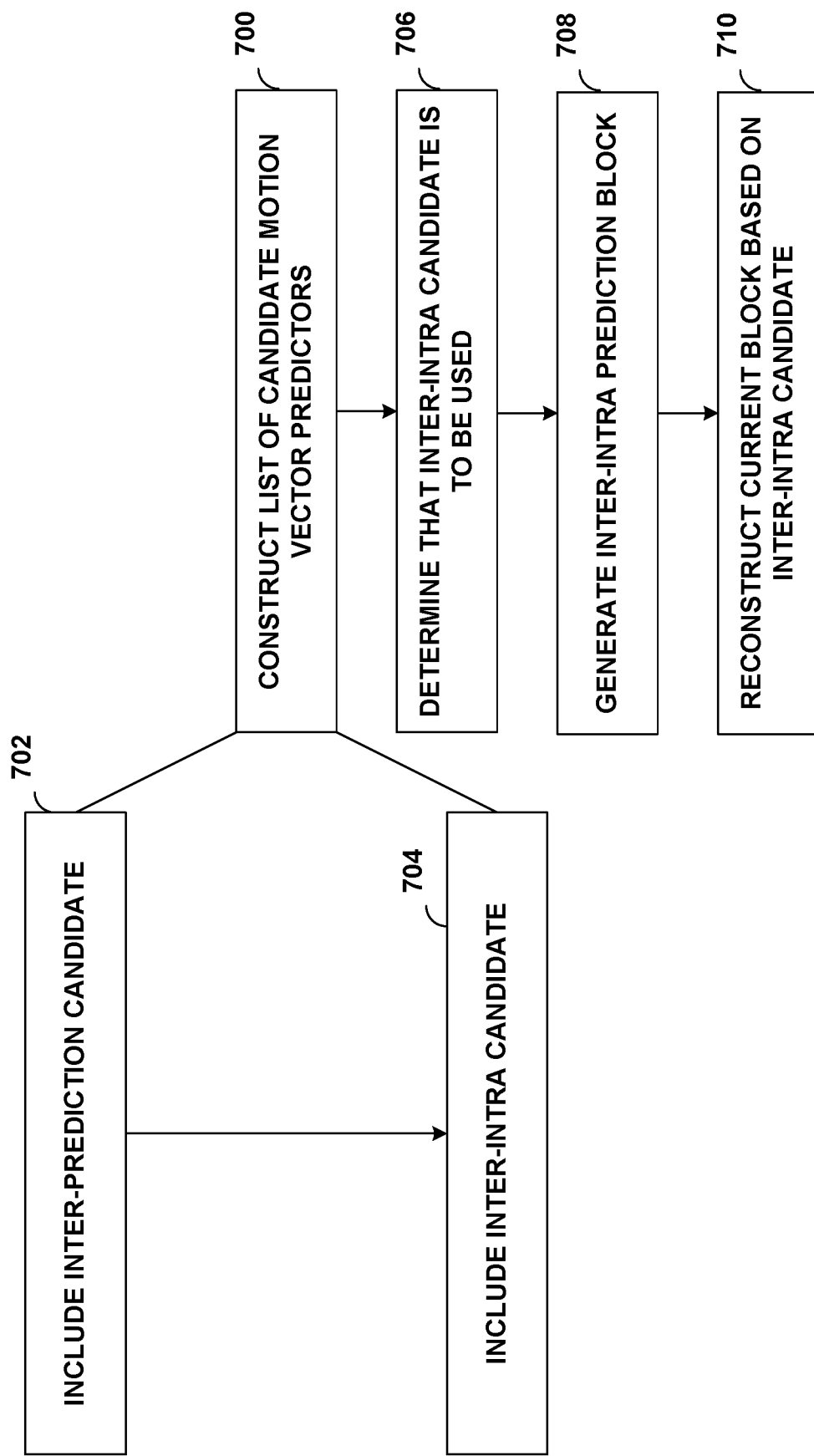
FIG. 17 is a flowchart illustrating an example method of decoding video data.

FIG. 17 is a flowchart illustrating an example method of decoding video data. As illustrated, video decoder 300 may be configured to construct a list of candidate motion vector predictors, for storage in memory, for a current block (700). Examples of the list of candidate motion vector predictors include the merge candidate list and the AMVP candidate list.

In one example, to construct the list of candidate motion vector predictors, video decoder 300 may include an inter-prediction candidate in the list of candidate motion vector predictors (702). The inter-prediction candidate may be motion information of a neighboring or collocated block of the current block. Video decoder 300 may also include an inter-intra candidate in the list of candidate motion vector predictors (704). The inter-intra candidate may include information to generate a first prediction block according to an intra-prediction mode and information to generate a second prediction block according to an inter-prediction mode.

In FIG. 17, the inter-prediction candidate is illustrated as being included first, and after including the inter-prediction candidate, video decoder 300 may include the inter-intra candidate in the list of candidate motion vector predictors. However, in some examples, video decoder 300 may first include the inter-intra candidate, and then include the inter-prediction candidate in the list of motion vector predictors.

There may be various ways in which video decoder 300 may determine the motion information for the second prediction block and the intra-prediction mode for the first prediction block. For instance, video decoder 300 may receive information in the bitstream of the motion information and the intra-prediction mode. As another example, video decoder 300 may determine the motion information and the intra-prediction mode based on neighboring blocks. As another example, video decoder 300 may determine motion information of an inter-predicted block identified by a smallest index in the list of candidate motion vector predictors to determine the information to generate the second prediction block, and generate the second prediction block based on the motion information. Video decoder 300 may determine an intra-prediction mode to determine the information to generate the first prediction block, and generate the first prediction block based on the determined intra-prediction mode.

In some examples, video decoder 300 may determine a smallest index (e.g., MinInterIntraIdx) where the inter-intra candidate can be included in the list of candidate motion vector predictors. In such examples, video decoder 300 may include the inter-intra candidate in the list of candidate motion vector predictors based on the determined smallest index where the inter-intra candidate can be included.

In some examples, video decoder 300 may determine a maximum number of allowable inter-intra candidates (e.g., InterIntraNum). In such examples, video decoder 300 may include the inter-intra candidate in the list of candidate motion vector predictors based on the determined maximum number of allowable inter-intra candidates (e.g., so that the number of inter-intra candidates is not greater than InterIntraNum).

Video decoder 300 may determine that the inter-intra candidate is to be used (706). For example, video decoder 300 may receive an index into the list of candidate motion vector predictors, and determine that the inter-intra candidate is identified in the list of candidate motion vector predictors by the received index. Video decoder 300 may generate the inter-intra-prediction block using the first and second prediction blocks (e.g., using any of the techniques described above or other techniques) (708). In this manner, video decoder 300 may determine that the inter-intra candidate is to be used to generate the inter-intra-prediction block for the current block without receiving any additional signaling indicating that the current block is predicted according to an inter-intra-prediction mode (e.g., that the current block is predicted with the inter-intra-prediction block).

Video decoder 300 may reconstruct the current block based on the inter-intra candidate (710). For example, video decoder 300 may add values of the prediction block to values of a residual block to reconstruct the current block.

Figure 18:
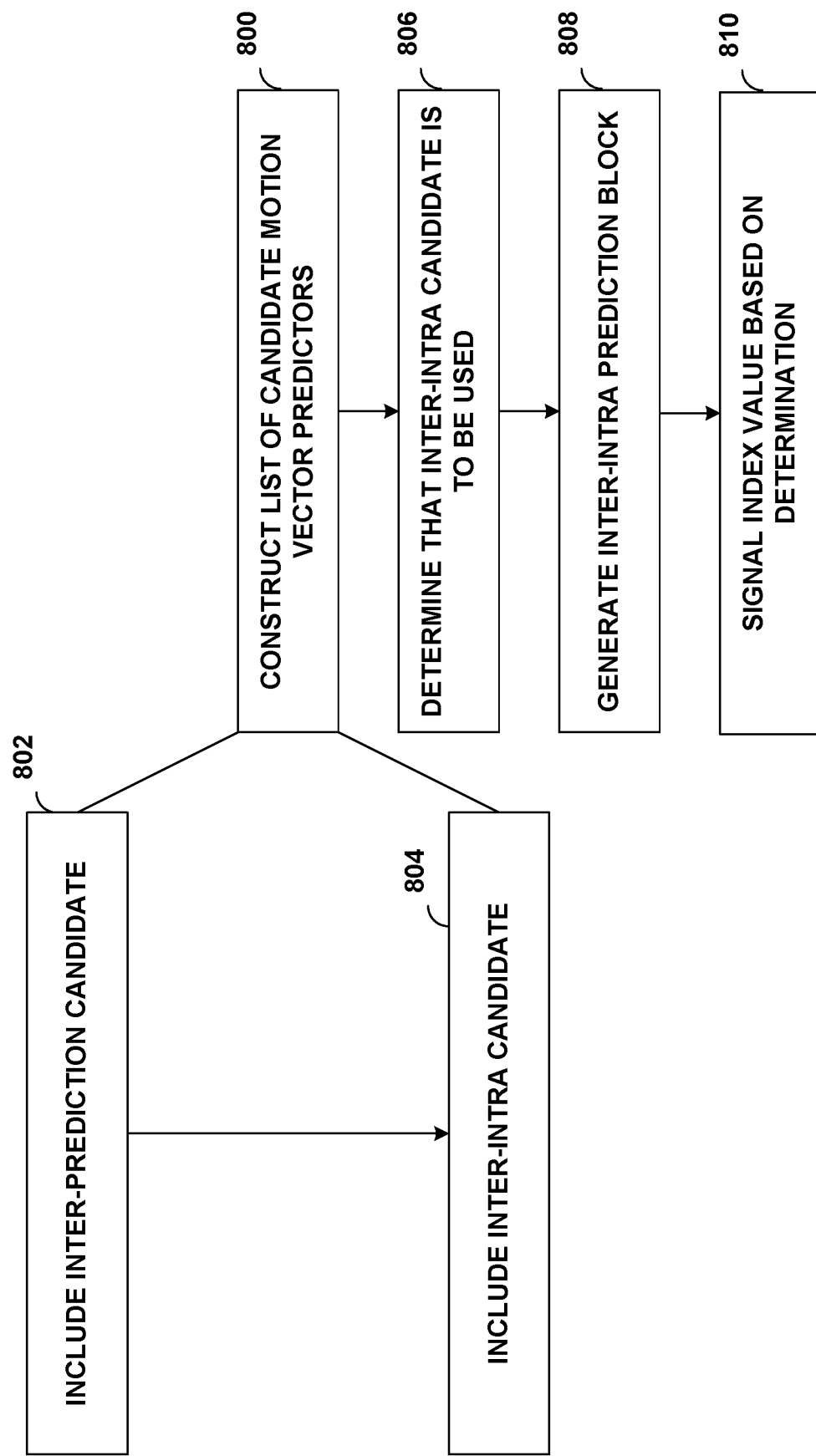
FIG. 18 is a flowchart illustrating an example method of encoding video data.

FIG. 18 is a flowchart illustrating an example method of encoding video data. As illustrated, video encoder 200 may be configured to construct a list of candidate motion vector predictors, for storage in memory, for a current block (800). Examples of the list of candidate motion vector predictors include the merge candidate list and the AMVP candidate list.

In one example, to construct the list of candidate motion vector predictors, video encoder 200 may include an inter-prediction candidate in the list of candidate motion vector predictors (802). The inter-prediction candidate may be motion information of a neighboring or collocated block of the current block. Video encoder 200 may also include an inter-intra candidate in the list of candidate motion vector predictors (804). The inter-intra candidate may include information to generate a first prediction block according to an intra-prediction mode and information to generate a second prediction block according to an inter-prediction mode.

In this way, the inter-intra-prediction block is identified in a list of candidate motion vector predictors, and can be used to predict the current block. For instance, the list of candidate motion vector predictors is leveraged to identify an inter-intra-prediction block.

In FIG. 18, the inter-prediction candidate is illustrated as being included first, and after including the inter-prediction candidate, video encoder 200 may include the inter-intra candidate in the list of candidate motion vector predictors. However, in some examples, video encoder 200 may first include the inter-intra candidate, and then include the inter-prediction candidate in the list of motion vector predictors.

There may be various ways in which video encoder 200 may determine the motion information for the second prediction block and the intra-prediction mode for the first prediction block. For instance, video encoder 200 may signal information in the bitstream of the motion information and the intra-prediction mode. As another example, video encoder 200 may determine the motion information and the intra-prediction mode based on neighboring blocks. As another example, video encoder 200 may determine motion information of an inter-predicted block identified by a smallest index in the list of candidate motion vector predictors to determine the information to generate the second prediction block, and generate the second prediction block based on the motion information. Video encoder 200 may determine an intra-prediction mode to determine the information to generate the first prediction block, and generate the first prediction block based on the determined intra-prediction mode.

In some examples, video encoder 200 may determine a smallest index (e.g., MinInterIntraIdx) where the inter-intra candidate can be included in the list of candidate motion vector predictors. In such examples, video encoder 200 may include the inter-intra candidate in the list of candidate motion vector predictors based on the determined smallest index where the inter-intra candidate can be included.

In some examples, video encoder 200 may determine a maximum number of allowable inter-intra candidates (e.g., InterIntraNum). In such examples, video encoder 200 may include the inter-intra candidate in the list of candidate motion vector predictors based on the determined maximum number of allowable inter-intra candidates (e.g., so that the number of inter-intra candidates is not greater than InterIntraNum).

Video encoder 200 may determine that the inter-intra candidate is to be used (806). For example, video encoder 200 may determine that the inter-intra-prediction block provides the best quality. Video encoder 200 may generate the inter-intra-prediction block using the first and second prediction blocks (e.g., using any of the techniques described above or other techniques) (808). In this manner, video encoder 200 may indicate to video decoder 300 that the inter-intra candidate is to be used as the prediction block for the current block without needing to signal any additional information indicating that the current block is predicted according to an inter-intra-prediction mode (e.g., that the current block is predicted with the inter-intra-prediction block).

Video encoder 200 may signal an index value into the list of candidate motion vector predictors that identifies the inter-intra candidate in the list of candidate motion vector predictors based on the determination (810). Video encoder 200 may also determine a residual between the current block and the prediction block, and signal information indicative of the residual.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
constructing a list of candidate motion vector predictors for a current block of the video data, wherein constructing the list of candidate motion vector predictors comprises including an inter-prediction candidate in the list of candidate motion vector predictors, and wherein the inter-prediction candidate comprises motion information including information of a motion vector of a neighboring or collocated block of the current block;
determining that an inter-intra mode is to be used for the current block;
generating a first prediction block based on an intra-prediction mode;
generating a second prediction block based on information for an inter-prediction mode, wherein the information for the inter-prediction mode is based on a candidate motion vector predictor selected from the constructed list of candidate motion vector predictors;
generating an inter-intra-prediction block based on the first prediction block and the second prediction block; and
reconstructing the current block based on the inter-intra-prediction block.

2. The method of claim 1, wherein reconstructing the current block based on the inter-intra-prediction block comprises adding values of the inter-intra-prediction block to values of a residual block to reconstruct the current block.

3. The method of claim 1, wherein determining that the inter-intra mode is to be used for the current block comprises:
receiving an index into the list of candidate motion vector predictors;
determining that an inter-intra candidate is identified by the received index into the list of candidate motion vector predictors, wherein the inter-intra candidate comprises information to generate the first prediction block based on the intra-prediction mode and the information for the inter-prediction mode to generate the second prediction block.

4. The method of claim 3, wherein determining that the inter-intra mode is to be used comprises determining that the inter-intra mode is to be used without receiving any additional signaling indicating that the current block is predicted according to the inter-intra mode.

5. The method of claim 1, wherein constructing the list of candidate motion vector comprises:

after including the inter-prediction candidate into the list of candidate motion vector predictors, including an inter-intra candidate in the same list of candidate motion vector predictors that includes the inter-prediction candidate, wherein the inter-intra candidate comprises information to generate the first prediction block based on the intra-prediction mode and the information for the inter-prediction mode to generate the second prediction block.

6. The method of claim 1, further comprising:
determining the information for the inter-prediction mode based on the candidate motion vector predictor by determining motion information of an inter-predicted block identified by a smallest index in the list of candidate motion vector predictors,
wherein generating the second prediction block comprises generating the second prediction block based on the determined motion information.

7. The method of claim 1, further comprising:
determining a maximum number of allowable inter-intra candidates; and
including an inter-intra candidate in the list of candidate motion vector predictors based on the determined maximum number of allowable inter-intra candidates, wherein the inter-intra candidate comprises information to generate the first prediction block based on the intra-prediction mode and the information for the inter-prediction mode to generate the second prediction block.

8. The method of claim 1, wherein the list of candidate motion vector predictors comprises one of a merge candidate list or an advanced motion vector prediction (AMVP) candidate list.

9. The method of claim 1, further comprising:
determining the intra-prediction mode to determine information to generate the first prediction block,
wherein generating the first prediction block comprises generating the first prediction block based on the determined information to generate the first prediction block.

10. A method of encoding video data, the method comprising:
constructing a list of candidate motion vector predictors for a current block of the video data, wherein constructing the list of candidate motion vector predictors comprise including an inter-prediction candidate in the list of candidate motion vector predictors, and wherein the inter-prediction candidate comprises motion information including information of a motion vector of a neighboring or collocated block of the current block;
determining that an inter-intra candidate mode is to be used for the current block;
generating a first prediction block based on an intra-prediction mode;
generating a second prediction block based on information for an inter-prediction mode, wherein the information for the inter-prediction mode is based on a candidate motion vector predictor selected from the constructed list of candidate motion vector predictors;
generating an inter-intra-prediction block based on the first prediction block and the second prediction block;
determining a residual between the current block and the inter-intra-prediction block; and
signaling information indicative of the residual.

11. The method of claim 10, wherein constructing the list of candidate motion vector comprises:
after including the inter-prediction candidate into the list of candidate motion vector predictors, including an inter-intra candidate in the same list of candidate motion vector predictors that includes the inter-prediction candidate, wherein the inter-intra candidate comprises information to generate the first prediction block based on the intra-prediction mode and the information for the inter-prediction mode to generate the second prediction block.

12. The method of claim 10, further comprising:
determining the information for the inter-prediction mode based on the candidate motion vector predictor by determining motion information of an inter-predicted block identified by a smallest index in the list of candidate motion vector predictors,
wherein generating the second prediction block comprises generating the second prediction block based on the determined motion information.

13. The method of claim 10, further comprising:
determining a maximum number of allowable inter-intra candidates; and
including an inter-intra candidate in the list of candidate motion vector predictors based on the determined maximum number of allowable inter-intra candidates, wherein the inter-intra candidate comprises information to generate the first prediction block based on the intra-prediction mode and the information for the inter-prediction mode to generate the second prediction block.

14. The method of claim 10, wherein the list of candidate motion vector predictors comprises one of a merge candidate list or an advanced motion vector prediction (AMVP) candidate list.

15. The method of claim 10, further comprising:
determining the intra-prediction mode to determine information to generate the first prediction block,
wherein generating the first prediction block comprises generating the first prediction block based on the determined information to generate the first prediction block.

16. A device for decoding video data, the device comprising:
a memory; and
processing circuitry configured to:
construct a list of candidate motion vector predictors, for storage in the memory, for a current block of the video data, wherein to construct the list of candidate motion vector predictors, the processing circuitry is configured to include an inter-prediction candidate in the list of candidate motion vector predictors, and wherein the inter-prediction candidate comprises motion information including information of a motion vector of a neighboring or collocated block of the current block;
determine that an inter-intra mode is to be used for the current block;
generate a first prediction block based on an intra-prediction mode;
generate a second prediction block based on information for an inter-prediction mode, wherein the information for the inter-prediction mode is based on a candidate motion vector predictor selected from the constructed list of candidate motion vector predictors;
generate an inter-intra-prediction block based on the first prediction block and the second prediction block; and reconstruct the current block based on the inter-intra-prediction block.

17. The device of claim 16, wherein to reconstruct the current block based on the inter-intra-prediction block, the processing circuitry is configured to add values of the inter-intra-prediction block to values of a residual block to reconstruct the current block.

18. The device of claim 16, wherein to determine that the inter-intra mode is to be used for the current block, the processing circuitry is configured to:
receive an index into the list of candidate motion vector predictors;
determine that an inter-intra candidate is identified by the received index into the list of candidate motion vector predictors, wherein the inter-intra candidate comprises information to generate the first prediction block based on the intra-prediction mode and the information for the inter-prediction mode to generate the second prediction block.

19. The device of claim 18, wherein to determine that the inter-intra mode is to be used, the processing circuitry is configured to determine that the inter-intra mode is to be used without receiving any additional signaling indicating that the current block is predicted according to the inter-intra mode.

20. The device of claim 16, wherein to construct the list of candidate motion vector, the processing circuitry is configured to:
after including the inter-prediction candidate into the list of candidate motion vector predictors, include an inter-intra candidate in the same list of candidate motion vector predictors that includes the inter-prediction candidate, wherein the inter-intra candidate comprises information to generate the first prediction block based on the intra-prediction mode and the information for the inter-prediction mode to generate the second prediction block.

21. The device of claim 16, wherein the processing circuitry is configured to:
determine the information for the inter-prediction mode based on the candidate motion vector predictor by determining motion information of an inter-predicted block identified by a smallest index in the list of candidate motion vector predictors,
wherein to generate the second prediction block, the processing circuitry is configured to generate the second prediction block based on the determined motion information.

22. The device of claim 16, wherein the processing circuitry is configured to:
determine a maximum number of allowable inter-intra candidates; and
include an inter-intra candidate in the list of candidate motion vector predictors based on the determined maximum number of allowable inter-intra candidates, wherein the inter-intra candidate comprises information to generate the first prediction block based on the intra-prediction mode and the information for the inter-prediction mode to generate the second prediction block.

23. The device of claim 16, wherein the list of candidate motion vector predictors comprises one of a merge candidate list or an advanced motion vector prediction (AMVP) candidate list.

24. The device of claim 16, wherein the processing circuitry is configured to:
determine the intra-prediction mode to determine information to generate the first prediction block,
wherein to generate the first prediction block comprises generating the first prediction block based on the determined information to generate the first prediction block.

25. A device for encoding video data, the device comprising:
memory; and
processing circuitry configured to:
construct a list of candidate motion vector predictors, for storage in the memory, for a current block of the video data, wherein to construct the list of candidate motion vector predictors, the processing circuitry is configured to include an inter-prediction candidate in the list of candidate motion vector predictors, and wherein the inter-prediction candidate comprises motion information including information of a motion vector of a neighboring or collocated block of the current block;
determine that an inter-intra candidate mode is to be used for the current block;
generate a first prediction block based on an intra-prediction mode;
generate a second prediction block based on information for an inter-prediction mode, wherein the information for the inter-prediction mode is based on a candidate motion vector predictor selected from the constructed list of candidate motion vector predictors;
generate an inter-intra-prediction block based on the first prediction block and the second prediction block;
determine a residual between the current block and the inter-intra-prediction block; and
signal information indicative of the residual.

26. The device of claim 25, wherein to construct the list of candidate motion vector, the processing circuitry is configured to:
after including the inter-prediction candidate into the list of candidate motion vector predictors, include an inter-intra candidate in the same list of candidate motion vector predictors that includes the inter-prediction candidate, wherein the inter-intra candidate comprises information to generate the first prediction block based on the intra-prediction mode and the information for the inter-prediction mode to generate the second prediction block.

27. The device of claim 25, wherein the processing circuitry is configured to:
determine the information for the inter-prediction mode based on the candidate motion vector predictor by determining motion information of an inter-predicted block identified by a smallest index in the list of candidate motion vector predictors,
wherein to generate the second prediction block comprises generating the second prediction block based on the determined motion information.

28. The device of claim 25, wherein the processing circuitry is configured to:
determine a maximum number of allowable inter-intra candidates; and
include an inter-intra candidate in the list of candidate motion vector predictors based on the determined maximum number of allowable inter-intra candidates, wherein the inter-intra candidate comprises information to generate the first prediction block based on the intra-prediction mode and the information for the inter-prediction mode to generate the second prediction block.

29. The device of claim 25, wherein the list of candidate motion vector predictors comprises one of a merge candidate list or an advanced motion vector prediction (AMVP) candidate list.

30. The device of claim 25, wherein the processing circuitry is configured to:
   determine the intra-prediction mode to determine information to generate the first prediction block,
   wherein to generate the first prediction block, the processing circuitry is configured to generate the first prediction block based on the determined information to generate the first prediction block.

31. A non-transitory computer-readable storage medium storing instructions thereon that when executed cause one or more processors to:
   construct a list of candidate motion vector predictors for a current block of the video data, wherein the instructions that cause the one or more processors to construct the list of candidate motion vector predictors comprise instructions that cause the one or more processors to include an inter-prediction candidate in the list of candidate motion vector predictors, and wherein the inter-prediction candidate comprises motion information including information of a motion vector of a neighboring or collocated block of the current block;
   determine that an inter-intra mode is to be used for the current block;
   generate a first prediction block based on an intra-prediction mode;
   generate a second prediction block based on information for an inter-prediction mode, wherein the information for the inter-prediction mode is based on a candidate motion vector predictor selected from the constructed list of candidate motion vector predictors;
   generate an inter-intra-prediction block based on the first prediction block and the second prediction block; and
   at least one of:
      reconstruct the current block based on the inter-intra-prediction block; or
      signal information indicative of a residual between the current block and the inter-intra-prediction block.

32. A device for coding video data, the device comprising:
   means for constructing a list of candidate motion vector predictors for a current block of the video data, wherein the means for constructing the list of candidate motion vector predictors comprises means for including an inter-prediction candidate in the list of candidate motion vector predictors, and wherein the inter-prediction candidate comprises motion information including information of a motion vector of a neighboring or collocated block of the current block;
   means for determining that an inter-intra mode is to be used for the current block;
   means for generating a first prediction block based on an intra-prediction mode;
   means for generating a second prediction block based on information for an inter-prediction mode, wherein the information for the inter-prediction mode is based on a candidate motion vector predictor selected from the constructed list of candidate motion vector predictors;
   means for generating an inter-intra-prediction block based on the first prediction block and the second prediction block; and
   at least one of:
      means for reconstructing the current block based on the inter-intra-prediction block; or
      means for signaling information indicative of a residual between the current block and the inter-intra-prediction block.

* * * * *